US012739835B2

(12) United States Patent
Yang et al.

(10) Patent No.: US 12,739,835 B2
(45) Date of Patent: Sep. 15, 2026

(54) COLLISION HANDLING BETWEEN PUCCH REPETITIONS

(71) Applicant: QUALCOMM Incorporated, San Diego, CA (US)

(72) Inventors: Wei Yang, San Diego, CA (US); Yi Huang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 506 days.

(21) Appl. No.: 18/069,930

(22) Filed: Dec. 21, 2022

(65) Prior Publication Data

US 2023/0319828 A1 Oct. 5, 2023

Related U.S. Application Data

(60) Provisional application No. 63/334,040, filed on Apr. 22, 2022, provisional application No. 63/326,203, filed on Mar. 31, 2022.

(51) Int. Cl.

| | |
|---|---|
| ***H04W 72/04*** | (2023.01) |
| ***H04W 72/12*** | (2023.01) |
| ***H04W 72/21*** | (2023.01) |
| ***H04W 72/56*** | (2023.01) |

(52) U.S. Cl.

CPC ........... *H04W 72/21* (2023.01); *H04W 72/12* (2013.01); *H04W 72/56* (2023.01)

(58) Field of Classification Search

None

See application file for complete search history.

(56) References Cited

U.S. PATENT DOCUMENTS

| | | | | |
|---|---|---|---|---|
| 2019/0230683 | A1* | 7/2019 | Akkarakaran | H04L 5/0053 |
| 2020/0053762 | A1 | 2/2020 | Li | |
| 2020/0068558 | A1 | 2/2020 | Yang et al. | |
| 2020/0128576 | A1 | 4/2020 | Jung et al. | |
| 2020/0314900 | A1* | 10/2020 | Hosseini | H04W 72/56 |
| 2020/0322972 | A1* | 10/2020 | Hosseini | H04W 72/23 |
| 2021/0014880 | A1* | 1/2021 | Jiang | H04W 72/0446 |
| 2021/0058922 | A1* | 2/2021 | Han | H04L 1/1664 |
| 2021/0136791 | A1 | 5/2021 | Akkarakaran et al. | |
| 2021/0144743 | A1* | 5/2021 | Rastegardoost | H04W 72/23 |
| 2021/0243786 | A1 | 8/2021 | Yang et al. | |

(Continued)

OTHER PUBLICATIONS

International Search Report and Written Opinion—PCT/US2023/063862—ISA/EPO—Jun. 15, 2023.

*Primary Examiner* — Sai Aung

(74) *Attorney, Agent, or Firm* — Holland & Hart LLP

(57) ABSTRACT

Methods, systems, and devices for wireless communications are described. A user equipment (UE) may receive one or more control messages that collectively schedule three or more physical uplink control channels (PUCCHs) involving at least two scheduling overlaps, at least one of the three or more PUCCHs with repetition across multiple transmission time intervals (TTIs). The UE and the network entity may perform a conflict resolution procedure to resolve the two or more scheduling overlaps, the conflict resolution procedure based on an order for resolving scheduling overlaps between the three or more PUCCHs. The UE may transmit, to the network entity, a resolved set of PUCCHs from the from the three or more PUCCHs based on the conflict resolution procedure.

30 Claims, 18 Drawing Sheets

(56) References Cited

U.S. PATENT DOCUMENTS

| | | | | |
|---|---|---|---|---|
| 2021/0259010 | A1 | 8/2021 | Yang et al. | |
| 2021/0337538 | A1* | 10/2021 | Li | H04L 5/0055 |
| 2021/0345341 | A1* | 11/2021 | Zewail | H04L 1/1614 |
| 2022/0167315 | A1* | 5/2022 | Park | H04W 72/0446 |
| 2022/0240295 | A1* | 7/2022 | Gao | H04W 72/23 |
| 2022/0256562 | A1* | 8/2022 | Behravan | H04W 72/569 |
| 2022/0295479 | A1* | 9/2022 | Behravan | H04W 72/20 |
| 2023/0035886 | A1* | 2/2023 | Chen | H04L 5/0057 |

* cited by examiner

COLLISION HANDLING BETWEEN PUCCH REPETITIONS

CROSS REFERENCE

The present Application for patent claims the benefit of U.S. Provisional Patent Application No. 63/326,203 by YANG et al., entitled "COLLISION HANDLING BETWEEN PUCCH REPETITIONS," filed Mar. 31, 2022, and the benefit of U.S. Provisional Patent Application No. 63/334,040 by YANG et al., entitled "COLLISION HANDLING BETWEEN PUCCH REPETITIONS," filed Apr. 22, 2022, each of which is assigned to the assignee hereof, and each of which is expressly incorporated by reference herein.

FIELD OF TECHNOLOGY

The following relates to wireless communications, including collision handling between physical uplink control channel (PUCCH) repetitions.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support collision handling between physical uplink control channel (PUCCH) repetitions. For example, the described techniques provide for resolution of scheduling overlaps involving three or more PUCCHs with at least one PUCCH with repetition across multiple transmission time intervals (TTIs). A user equipment (UE) and a network entity scheduled to receive the scheduled PUCCHs may determine a first set of PUCCHs with repetition across multiple TTIs and a second set of PUCCHs, each of the second set of PUCCHs scheduled for transmission within a respective single TTI (e.g., a slot). The UE and the network entity may perform a conflict resolution procedure to resolve the scheduling overlaps between the three or more PUCCHs based on an order for resolving scheduling overlaps between the three or more PUCCHs. For example, the order may be based on the first set of PUCCHs with repetition across multiple TTIs and the second set of PUCCHs each scheduled for transmission within a respective single TTI. The UE may transmit, to the network entity, a resolved set of PUCCHs from the three or more PUCCHs based on the conflict resolution procedure.

A method for wireless communications at a user equipment (UE) is described. The method may include receiving, from a network entity, one or more control messages that collectively schedule three or more uplink control channels involving two or more scheduling overlaps between the three or more uplink control channels, at least one of the three or more uplink control channels scheduled with repetition across multiple transmission time intervals, performing a conflict resolution procedure to resolve the two or more scheduling overlaps, the conflict resolution procedure based on an order for resolving scheduling overlaps between the three or more uplink control channels, and transmitting a resolved set of uplink control channels from the three or more uplink control channels based on the conflict resolution procedure.

An apparatus for wireless communications at a UE is described. The apparatus may include a processor, memory coupled with the processor, and instructions stored in the memory. The instructions may be executable by the processor to cause the apparatus to receive, from a network entity, one or more control messages that collectively schedule three or more uplink control channels involving two or more scheduling overlaps between the three or more uplink control channels, at least one of the three or more uplink control channels scheduled with repetition across multiple transmission time intervals, perform a conflict resolution procedure to resolve the two or more scheduling overlaps, the conflict resolution procedure based on an order for resolving scheduling overlaps between the three or more uplink control channels, and transmit a resolved set of uplink control channels from the three or more uplink control channels based on the conflict resolution procedure.

Another apparatus for wireless communications at a UE is described. The apparatus may include means for receiving, from a network entity, one or more control messages that collectively schedule three or more uplink control channels involving two or more scheduling overlaps between the three or more uplink control channels, at least one of the three or more uplink control channels scheduled with repetition across multiple transmission time intervals, means for performing a conflict resolution procedure to resolve the two or more scheduling overlaps, the conflict resolution procedure based on an order for resolving scheduling overlaps between the three or more uplink control channels, and means for transmitting a resolved set of uplink control channels from the three or more uplink control channels based on the conflict resolution procedure.

A non-transitory computer-readable medium storing code for wireless communications at a UE is described. The code may include instructions executable by a processor to receive, from a network entity, one or more control messages that collectively schedule three or more uplink control channels involving two or more scheduling overlaps between the three or more uplink control channels, at least one of the three or more uplink control channels scheduled with repetition across multiple transmission time intervals, perform a conflict resolution procedure to resolve the two or more scheduling overlaps, the conflict resolution procedure based on an order for resolving scheduling overlaps between the three or more uplink control channels, and transmit a resolved set of uplink control channels from the three or more uplink control channels based on the conflict resolution procedure.

Some examples of the method, apparatuses, and non-transitory computer-readable medium described herein may further include operations, features, means, or instructions for determining, from the three or more uplink control channels, a first set of uplink control channels with repetition across multiple transmission time intervals and a second set of uplink control channels, each of the second set of uplink control channels scheduled for transmission within a respective single transmission time interval.

In some examples of the method, apparatuses, and non-transitory computer-readable medium described herein, performing the conflict resolution procedure may include operations, features, means, or instructions for resolving, at a first stage, first scheduling overlaps between uplink control channels of the first set of uplink control channels and second scheduling overlaps between uplink control channels of the first set of uplink control channels and the second set of uplink control channels to generate a third set of uplink control channels and resolving, at a second stage, third scheduling overlaps between uplink control channels associated with single transmission time intervals of the third set of uplink control channels to generate the resolved set of uplink control channels.

In some examples of the method, apparatuses, and non-transitory computer-readable medium described herein, resolving the first scheduling overlaps and the second scheduling overlaps may include operations, features, means, or instructions for generating an ordering of the first set of uplink control channels and the second set of uplink control channels, where the order includes the ordering and resolving the first scheduling overlaps and the second scheduling overlaps based on the ordering and a priority level associated with each uplink control channel of the first set of uplink control channels and the second set of uplink control channels.

In some examples of the method, apparatuses, and non-transitory computer-readable medium described herein, resolving the first scheduling overlaps and the second scheduling overlaps based on the priority level associated with each uplink control channel of the first set of uplink control channels and the second set of uplink control channels may include operations, features, means, or instructions for canceling, for each first scheduling overlap and for each second scheduling overlap, an uplink control channel associated with a lower priority level.

In some examples of the method, apparatuses, and non-transitory computer-readable medium described herein, the third set of uplink control channels includes no scheduling overlaps involving an uplink control channel scheduled with repetition across multiple transmission time intervals.

In some examples of the method, apparatuses, and non-transitory computer-readable medium described herein, resolving the third scheduling overlaps between uplink control channels associated with single transmission time intervals of the third set of uplink control channels may include operations, features, means, or instructions for multiplexing, for each third scheduling overlap, the respective associated uplink control channels.

In some examples of the method, apparatuses, and non-transitory computer-readable medium described herein, performing the conflict resolution procedure may include operations, features, means, or instructions for identifying one or more groups of overlapping uplink control channels of the three or more uplink control channels and selecting a respective uplink control channel from each group of overlapping uplink control channels based on a priority level associated with each uplink control channel of the three or more uplink control channels to generate the resolved set of uplink control channels from the three or more uplink control channels.

In some examples of the method, apparatuses, and non-transitory computer-readable medium described herein, the priority level may be based on a type of transmission associated with each uplink control channel and a scheduled starting time of each uplink control channel.

In some examples of the method, apparatuses, and non-transitory computer-readable medium described herein, a first uplink control channel having a higher uplink control information type priority may have a higher priority level than a second uplink control channel having a lower uplink control information type priority and a third uplink control channel having a same higher uplink control information type priority as the first uplink control channel may have a higher priority level based on the third uplink control channel having an earlier starting slot than the first uplink control channel.

In some examples of the method, apparatuses, and non-transitory computer-readable medium described herein, identifying the one or more groups of overlapping uplink control channels may include operations, features, means, or instructions for identifying a temporally first uplink control channel of the three or more uplink control channels and uplink control channels of the three or more uplink control channels that overlap with the temporally first uplink control channel.

In some examples of the method, apparatuses, and non-transitory computer-readable medium described herein, identifying the temporally first uplink control channel may include operations, features, means, or instructions for identifying a first uplink control channel within a set of uplink control channels with repetition across multiple transmission time intervals as the temporally first uplink control channel, where the first uplink control channel may be selected within the set of uplink control channels according to the order.

In some examples of the method, apparatuses, and non-transitory computer-readable medium described herein, the order includes, from a first set of uplink control channels with different starting symbols, assignment of a smallest index to an uplink control channel of the first set of uplink control channels with an earliest starting symbol and the order includes, between a second set of uplink control channels with a same starting symbol, assignment of the smallest index to an uplink control channel of the second set of uplink control channels with a longest duration.

In some examples of the method, apparatuses, and non-transitory computer-readable medium described herein, performing the conflict resolution procedure may include operations, features, means, or instructions for resolving a scheduling overlap involving the temporally first uplink control channel and identifying a second temporally first uplink control channel within a remaining one or more groups of overlapping uplink control channels and uplink control channels of the three or more uplink control channels that overlap with the second temporally first uplink control channel.

Some examples of the method, apparatuses, and non-transitory computer-readable medium described herein may further include operations, features, means, or instructions for canceling, for each group of overlapping uplink control channels, a remainder of the uplink control channels.

In some examples of the method, apparatuses, and non-transitory computer-readable medium described herein, performing the conflict resolution procedure may include operations, features, means, or instructions for generating an ordering of the three or more uplink control channels, where the order includes the ordering and resolving the two or more scheduling overlaps based on the ordering and a priority level associated with each of the three or more uplink control channels.

In some examples of the method, apparatuses, and non-transitory computer-readable medium described herein, performing the conflict resolution procedure may include operations, features, means, or instructions for resolving scheduling overlaps based on the order until no scheduling overlaps involving an uplink control channel scheduled with repetition across multiple transmission time intervals remain.

Some examples of the method, apparatuses, and non-transitory computer-readable medium described herein may further include operations, features, means, or instructions for determining the order based on determining a scheduled timing of the three or more uplink control channels and respective durations of the three or more uplink control channels.

A method for wireless communications at a network entity is described. The method may include transmitting one or more control messages that collectively schedule three or more uplink control channels involving two or more scheduling overlaps between the three or more uplink control channels, at least one of the three or more uplink control channels scheduled with repetition across multiple transmission time intervals, performing a conflict resolution procedure to resolve the two or more scheduling overlaps, the conflict resolution procedure based on an order for resolving scheduling overlaps between the three or more uplink control channels, and receiving a resolved set of uplink control channels from the three or more uplink control channels based on the conflict resolution procedure.

An apparatus for wireless communications at a network entity is described. The apparatus may include a processor, memory coupled with the processor, and instructions stored in the memory. The instructions may be executable by the processor to cause the apparatus to transmit one or more control messages that collectively schedule three or more uplink control channels involving two or more scheduling overlaps between the three or more uplink control channels, at least one of the three or more uplink control channels scheduled with repetition across multiple transmission time intervals, perform a conflict resolution procedure to resolve the two or more scheduling overlaps, the conflict resolution procedure based on an order for resolving scheduling overlaps between the three or more uplink control channels, and receive a resolved set of uplink control channels from the three or more uplink control channels based on the conflict resolution procedure.

Another apparatus for wireless communications at a network entity is described. The apparatus may include means for transmitting one or more control messages that collectively schedule three or more uplink control channels involving two or more scheduling overlaps between the three or more uplink control channels, at least one of the three or more uplink control channels scheduled with repetition across multiple transmission time intervals, means for performing a conflict resolution procedure to resolve the two or more scheduling overlaps, the conflict resolution procedure based on an order for resolving scheduling overlaps between the three or more uplink control channels, and means for receiving a resolved set of uplink control channels from the three or more uplink control channels based on the conflict resolution procedure.

A non-transitory computer-readable medium storing code for wireless communications at a network entity is described. The code may include instructions executable by a processor to transmit one or more control messages that collectively schedule three or more uplink control channels involving two or more scheduling overlaps between the three or more uplink control channels, at least one of the three or more uplink control channels scheduled with repetition across multiple transmission time intervals, perform a conflict resolution procedure to resolve the two or more scheduling overlaps, the conflict resolution procedure based on an order for resolving scheduling overlaps between the three or more uplink control channels, and receive a resolved set of uplink control channels from the three or more uplink control channels based on the conflict resolution procedure.

Some examples of the method, apparatuses, and non-transitory computer-readable medium described herein may further include operations, features, means, or instructions for determining, from the three or more uplink control channels, a first set of uplink control channels with repetition across multiple transmission time intervals and a second set of uplink control channels, each of the second set of uplink control channels scheduled for transmission within a respective single transmission time interval.

In some examples of the method, apparatuses, and non-transitory computer-readable medium described herein, performing the conflict resolution procedure may include operations, features, means, or instructions for resolving, at a first stage, first scheduling overlaps between uplink control channels of the first set of uplink control channels and second scheduling overlaps between uplink control channels of the first set of uplink control channels and the second set of uplink control channels to generate a third set of uplink control channels, resolving, at a second stage, third scheduling overlaps between uplink control channels associated with single transmission time intervals of the third set of uplink control channels to generate the resolved set of uplink control channels, and.

In some examples of the method, apparatuses, and non-transitory computer-readable medium described herein, resolving the first scheduling overlaps and the second scheduling overlaps may include operations, features, means, or instructions for generating an ordering of the first set of uplink control channels and the second set of uplink control channels, where the order includes the ordering and resolving the first scheduling overlaps and the second scheduling overlaps based on the ordering and a priority level associated with each uplink control channel of the first set of uplink control channels and the second set of uplink control channels.

In some examples of the method, apparatuses, and non-transitory computer-readable medium described herein, resolving the first scheduling overlaps and the second scheduling overlaps based on the priority level associated with each uplink control channel of the first set of uplink control channels and the second set of uplink control channels may include operations, features, means, or instructions for canceling, for each first scheduling overlap and for each second scheduling overlap, an uplink control channel associated with a lower priority level.

In some examples of the method, apparatuses, and non-transitory computer-readable medium described herein, the third set of uplink control channels includes no scheduling overlaps involving an uplink control channel scheduled with repetition across multiple transmission time intervals.

In some examples of the method, apparatuses, and non-transitory computer-readable medium described herein, resolving the third scheduling overlaps between uplink control channels associated with single transmission time intervals of the third set of uplink control channels may include operations, features, means, or instructions for multiplexing, for each third scheduling overlap, the respective associated uplink control channels.

In some examples of the method, apparatuses, and non-transitory computer-readable medium described herein, performing the conflict resolution procedure may include operations, features, means, or instructions for identifying one or more groups of overlapping uplink control channels of the three or more uplink control channels and selecting a respective uplink control channel from each group of overlapping uplink control channels based on a priority level associated with each uplink control channel of the three or more uplink control channels to generate the resolved set of uplink control channels from the three or more uplink control channels.

In some examples of the method, apparatuses, and non-transitory computer-readable medium described herein, the priority level may be based on a type of transmission associated with each uplink control channel and a scheduled starting time of each uplink control channel.

In some examples of the method, apparatuses, and non-transitory computer-readable medium described herein, a first uplink control channel having a higher uplink control information type priority may have a higher priority level than a second uplink control channel having a lower uplink control information type priority and a third uplink control channel having a same higher uplink control information type priority as the first uplink control channel may have a higher priority level based on the third uplink control channel having an earlier starting slot than the first uplink control channel.

In some examples of the method, apparatuses, and non-transitory computer-readable medium described herein, identifying the one or more groups of overlapping uplink control channels may include operations, features, means, or instructions for identifying a temporally first uplink control channel of the three or more uplink control channels and uplink control channels of the three or more uplink control channels that overlap with the temporally first uplink control channel.

In some examples of the method, apparatuses, and non-transitory computer-readable medium described herein, identifying the temporally first uplink control channel may include operations, features, means, or instructions for identifying a first uplink control channel within a set of uplink control channels with repetition across multiple transmission time intervals as the temporally first uplink control channel, where the first uplink control channel may be selected within the set of uplink control channels according to the order.

In some examples of the method, apparatuses, and non-transitory computer-readable medium described herein, the order includes, from a first set of uplink control channels with different starting symbols, assignment of a smallest index to an uplink control channel of the first set of uplink control channels with an earliest starting symbol and the order includes, between a second set of uplink control channels with a same starting symbol, assignment of the smallest index to an uplink control channel of the second set of uplink control channels with a longest duration.

In some examples of the method, apparatuses, and non-transitory computer-readable medium described herein, performing the conflict resolution procedure may include operations, features, means, or instructions for resolving a scheduling overlap involving the temporally first uplink control channel and identifying a second temporally first uplink control channel within a remaining one or more groups of overlapping uplink control channels and uplink control channels of the three or more uplink control channels that overlap with the second temporally first uplink control channel.

Some examples of the method, apparatuses, and non-transitory computer-readable medium described herein may further include operations, features, means, or instructions for canceling, for each group of overlapping uplink control channels, a remainder of the uplink control channels.

In some examples of the method, apparatuses, and non-transitory computer-readable medium described herein, performing the conflict resolution procedure may include operations, features, means, or instructions for generating an ordering of the three or more uplink control channels, where the order includes the ordering and resolving the two or more scheduling overlaps based on the ordering and a priority level associated with each of the three or more uplink control channels.

In some examples of the method, apparatuses, and non-transitory computer-readable medium described herein, performing the conflict resolution procedure may include operations, features, means, or instructions for resolving scheduling overlaps based on the order until no scheduling overlaps involving an uplink control channel scheduled with repetition across multiple transmission time intervals remain.

Some examples of the method, apparatuses, and non-transitory computer-readable medium described herein may further include operations, features, means, or instructions for determining the order based on determining a scheduled timing of the three or more uplink control channels and respective durations of the three or more uplink control channels.

DETAILED DESCRIPTION

Figure 1:
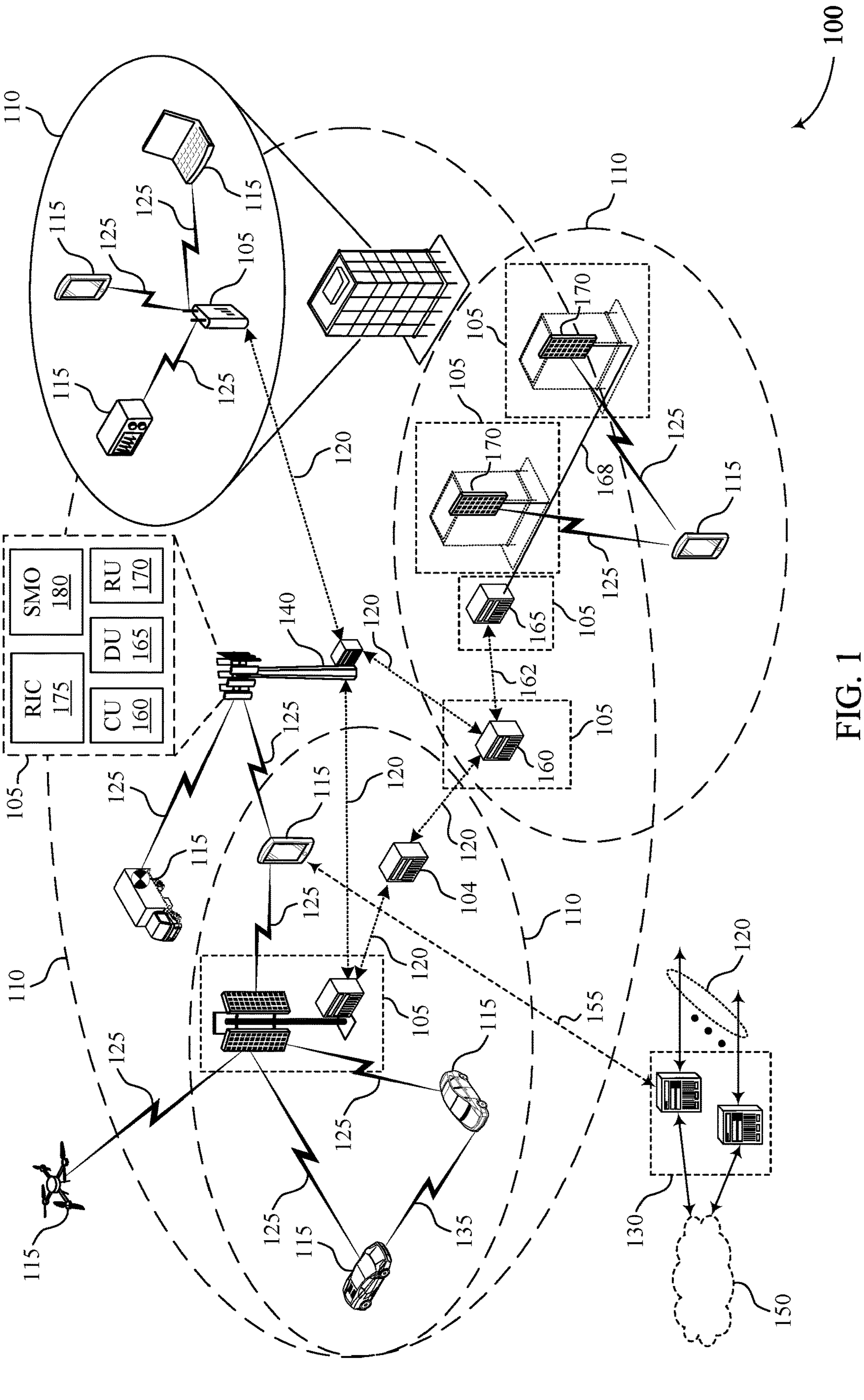
FIG. 1 illustrates an example of a wireless communications system that supports collision handling between physical uplink control channel (PUCCH) repetitions in accordance with one or more aspects of the present disclosure.

In some wireless communications systems, a network entity may schedule overlapping physical uplink control channels (PUCCHs) for transmission by a user equipment (UE). For example, two PUCCHs may overlap if the two PUCCHs at least partially overlap in time. If a UE is not capable of transmitting the overlapping channels simultaneously, the UE may follow an intra-UE multiplexing procedure to resolve the overlapping schedules (sometimes referred to as scheduling collisions). Some collision resolution procedures allow for cancellation or dropping of lower priority transmissions in favor of higher priority transmissions. Sometimes, though, the result of a collision resolution procedure (for example, in which transmissions are canceled) is dependent on an order by which overlapping transmissions are analyzed. Current rules for collision resolution were adopted without contemplating PUCCH repetitions. Thus, in a scenario where a PUCCH transmission with repetition (e.g., a PUCCH with repetition across multiple transmission time intervals (TTIs)) overlaps with two or more single-slot PUCCH transmissions (also referred to as PUCCHs associated with a single time interval), for example, current collision resolution procedures may fail to resolve the scheduling collision without ambiguity.

Techniques described herein manage scheduling collisions between PUCCHs with repetitions across slots and single-slot PUCCHs (e.g., PUCCHs scheduled for transmission within a single slot or TTI). The described techniques support scheduling collision resolution involving at least three PUCCHs, where at least at least one of the at least three PUCCHs is a PUCCH with repetition. The UE may perform a conflict resolution procedure based on the scheduling collision(s).

In some examples, to do so, a UE may identify a group of PUCCHs scheduled with repetition (e.g., identified as a set A) and the UE may identify a group of single-slot PUCCHs (e.g., identified as a set B). At a first stage, the UE may resolve collisions among the set A PUCCHs. The result of the first stage may be a set of PUCCHs with repetition that do not overlap each other, denoted set A'. In some cases, the PUCCHs may all be scheduled with repetition across multiple TTIs, in which case the collision resolution procedure may only involve the first stage as the first stage resolves collisions between the PUCCHs with repetition across multiple TTIs. In some examples, if only one PUCCH of the three or more PUCCHs is scheduled with repetition across multiple TTIs (e.g., if set A includes one PUCCH), the first stage may be omitted from the conflict resolution procedure (as there are no scheduling overlaps between PUCCHs scheduled with repetition across multiple TTIs), and accordingly the subset A' of the first set of PUCCHs (set A) includes the one PUCCH scheduled with repetition across multiple TTIs. In a second stage, collisions between PUCCHs of the set A' and PUCCHs of the set B may be resolved as a set C of PUCCHs. The resolution of the second stage may be such that any overlapping PUCCHs in C are PUCCHs without repetition. In other words, in the second stage, any overlap between PUCCHs with repetition and PUCCHs without repetition may be resolved. In some examples, in each of the first stage and the second stage, the resolutions may be based on a priority level associated with each PUCCH. For example, for each collision involving at least one PUCCH with repetition, the PUCCH involved in the collision having a lower priority level may be dropped or canceled. In a third stage, collisions among PUCCHs in set C are resolved in order to achieve a set D of non-overlapping PUCCHs. In some examples, the resolution of the third stage may be such that overlapping single-slot PUCCHs with the same priority level may be multiplexed. In some examples, the resolution of the third stage may be such that for overlapping single-slot PUCCHs with different priority levels, the lower priority level PUCCH may be dropped or canceled.

In some examples, the UE may apply the first stage to all overlapping PUCCHs, regardless of whether the PUCCH is scheduled with or without repetition. In other words, the set A includes all of the PUCCHs. Accordingly, the UE may resolve collisions among the PUCCHs and generate a set of PUCCHs that do not overlap with each other. Applying the first stage to all PUCCHs instead of applying the first stage to the PUCCHs scheduled with repetition may result in more cancellations or droppings of PUCCHs.

In some examples, the UE may identify one or more groups of overlapping PUCCHs, and then select the highest priority PUCCH from each group, and drop or cancel the other PUCCHs in each respective group. Within a given group, each PUCCH overlaps with at least another PUCCH, but in some examples, not all PUCCHs in a group must overlap with all other PUCCHs in the group.

A UE and a serving network entity may be configured to perform the same multi-stage conflict resolution procedure. As long as the UE and the serving network entity perform the same conflict resolution procedure, the UE and the serving network entity will reach the same determination in terms of which PUCCHs are prioritized. Accordingly, the described techniques may remove ambiguity when resolving scheduling conflicts involving PUCCHs with repetition.

Aspects of the disclosure are initially described in the context of wireless communications systems. Aspects of the disclosure are then described in the context of stages of multi-stage conflict resolution procedures and process flows. Aspects of the disclosure are further illustrated by and described with reference to apparatus diagrams, system diagrams, and flowcharts that relate to collision handling between PUCCH repetitions.

FIG. 1 illustrates an example of a wireless communications system 100 that supports collision handling between PUCCH repetitions in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another over a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 through a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending upon which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication over such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 over an interface (e.g., a backhaul link). IAB donor and IAB nodes 104 may communicate over an F1 interface according to a protocol that defines signaling messages (e.g., an F1 AP protocol). Additionally, or alternatively, the CU 160 may communicate with the core network over an interface, which may be an example of a portion of backhaul link, and may communicate with other CUs 160 (e.g., a CU 160 associated with an alternative IAB donor) over an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, and referred to as a child IAB node associated with an IAB donor. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, and may directly signal transmissions to a UE 115. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling over an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support collision handling between PUCCH repetitions as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) over one or more carriers. The term "carrier" may refer to a set of RF spectrum resources having a defined physical layer structure for supporting the communication links 125. For example, a carrier used for a communication link 125 may include a portion of an RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be positioned according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications over a particular carrier bandwidth or may be configurable to support communications over one of a set of carrier bandwidths. In some examples, the wireless communications system 100 may include network entities 105 or UEs 115 that support concurrent communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both) such that the more resource elements that a device receives and the higher the order of the modulation scheme, the higher the data rate may be for the device. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, where $\Delta f_{max}$, may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a TTI. In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., over a carrier) and may be associated with an identifier for distinguishing neighboring cells (e.g., a physical cell identifier (PCID), a virtual cell identifier (VCID), or others). In some examples, a cell may also refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be able to communicate directly with other UEs 115 over a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by or scheduled by the network entity 105. In some examples, one or more UEs 115 in such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without the involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, which may be referred to as clusters, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. While operating in unlicensed RF spectrum bands, devices such as the network entities 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located in diverse geographic locations. A network entity 105 may have an antenna array with a set of rows and columns of antenna ports that the network entity 105 may use to support beamforming of communications with a UE 115. Likewise, a UE 115 may have one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate over logical channels. A MAC layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a network entity 105 or a core network 130 supporting radio bearers for user plane data. At the PHY layer, transport channels may be mapped to physical channels.

The UEs 115 and the network entities 105 may support retransmissions of data to increase the likelihood that data is received successfully. Hybrid automatic repeat request (HARQ) feedback is one technique for increasing the likelihood that data is received correctly over a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In some other examples, the device may provide HARQ feedback in a subsequent slot, or according to some other time interval.

In some cases, a UE 115 may receive, from a network entity 105, one or more control messages that collectively schedule three or more PUCCHs involving two or more scheduling overlaps between the three or more PUCCHs, at least one of the three or more uplink control channels scheduled with repetition across multiple TTIs. In some cases, the UE 115 may determine, from the three or more PUCCHs, a first set of PUCCHs with repetition across multiple TTIs (e.g., set A) and a second set of PUCCHs (e.g., set B) each of the second set of PUCCHs scheduled for transmission within a respective single TTI. The UE 115 and the network entity 105 may perform a conflict resolution procedure to resolve the two or more scheduling overlaps, the conflict resolution procedure based on an order for resolving scheduling overlaps between the three or more PUCCHs. The UE 115 may transmit, to the network entity 105, a resolved set of PUCCHs from the three or more PUCCHs based on the conflict resolution procedure.

In some cases, the conflict resolution procedure may include multiple stages. For example, in a pair-wise resolution scheme, a first stage may involve resolving first scheduling overlaps between PUCCHs of the first set of PUCCHs (set A) to generate a subset of the first set of PUCCHs (set A'). In some cases, resolving the first scheduling overlaps may involve canceling, for each first scheduling overlap (e.g., for each pair), a PUCCH of the first set of PUCCHs associated with a lower priority level. A second stage may involve resolving second scheduling overlaps between PUCCHs of the subset of the first set of PUCCHs (set A') and PUCCHs of the second set of PUCCHs (set B) to generate a third set of PUCCHs (set C). In some cases, resolving the second scheduling overlap(s) may involve canceling, for each second scheduling overlap (e.g., for each pair), the PUCCH of the subset of the first set of PUCCHs or the PUCCH of the second set of PUCCHs associated with a lower priority level. A third stage may involve resolving third scheduling overlaps between PUCCHs associated with single TTIs of the third set of PUCCHs (set C) to generate the resolved set of PUCCHs (set D). In some cases, resolving the third scheduling overlaps may involve multiplexing overlapping single-slot channels with the same priority level. In some cases, resolving the third scheduling overlaps may involve canceling, for each third scheduling overlap where the respective PUCCHs are associated with different priority levels, the PUCCH with the lower priority level. In some cases, different PUCCHs may be associated with TTIs of different lengths (e.g., some PUCCHs may be slot-based and some PUCCHs may be sub-slot based). When resolving PUCCHs, a UE 115-*a* may first associate PUCCHs to a same TTI length (e.g., by either associating the PUCCHs to the smallest TTI length or to the longest TTI length).

The UE 115 may transmit the resolved set (set D) of PUCCHs to the network entity 105. As the network entity 105 may perform a corresponding conflict resolution procedure, the network entity 105 may expect to receive the resolved set (set D) of PUCCHs from the UE 115.

In some examples, the UE 115 may apply the first stage to all overlapping PUCCHs, regardless of whether the PUCCH is scheduled with or without repetition. In other words, the set A includes all of the PUCCHs. Accordingly, the UE 115 may resolve collisions among the PUCCHs and generate a set of PUCCHs that do not overlap with each other. The UE 115 may transmit the resolved set of PUCCHs to the network entity 105. As the network entity 105 may perform a corresponding conflict resolution procedure, the network entity 105 may expect to receive the resolved set of PUCCHs from the UE 115.

In some examples, the UE 115 may identify one or more groups of overlapping PUCCHs, and then select the highest priority PUCCH from each group, and drop or cancel the other PUCCHs in each respective group (e.g., a group-wise conflict resolution scheme). Within a given group, each PUCCH overlaps with at least another PUCCH, but in some examples not all PUCCHs in a group must overlap with all other PUCCHs in the group. Accordingly, overlaps between PUCCHs may be resolved and a resolved set of PUCCHs may be generated. The UE 115 may transmit the resolved set of PUCCHs to the network entity 105. As the network entity 105 may perform a corresponding conflict resolution procedure, the network entity 105 may expect to receive the resolved set of PUCCHs from the UE 115.

For example, in a group-wise conflict resolution scheme, the UE 115 may perform conflict resolution separately for each of the one or more groups after identifying the one or more groups of overlapping PUCCHs. If any PUCCH in a group is with repetition across multiple TTIs, the UE 115 may select the PUCCH in the group having the highest priority level and drop the remaining PUCCHs. If none of the PUCCHs in a group are scheduled with repetition across multiple TTIs, the UE 115 may multiplex the group of PUCCHs. Accordingly, in some examples, multiplexing may be performed selectively in groups depending on whether a given group contains a PUCCH with repetition across TTIs.

In some cases, the UE 115 may identify one or more overlapping groups of PUCCHs. In some examples, where there are multiple groups, the UE 115 may apply conflict resolution using an ordering starting from the group that starts or ends the earliest in time to the group that starts or ends the latest in time. In some examples, where there are multiple groups, the UE 115 may apply conflict resolution using an ordering starting from the group with a PUCCH with repetition across TTIs and then moving to a group without repetitions across TTIs. For example, the UE 115 may perform conflict resolution first in groups with one or more PUCCHs with repetition across TTIs and then may perform conflict resolution in groups without a PUCCH with repetition across TTIs. In some examples, the UE 115 may perform conflict resolution first in groups without a PUCCH with repetition across TTIs and then may perform conflict resolution in groups with one or more PUCCHs with repetition across TTIs.

In some examples, in the case that a first group (Group A) includes one or more PUCCHs with repetition across TTIs and a second group (Group B) does not include a PUCCH with repetition across TTIs, the UE 115 may not expect that the final multiplexed channel in Group B overlaps with a PUCCH with repetition across TTIs in Group A, regardless of whether a PUCCH with repetition across TTIs in Group A will be dropped or not during the conflict resolution procedure in Group A. In some examples, in the case that a first group (Group A) includes one or more PUCCHs with repetition across TTIs and a second group (Group B) does not include a PUCCH with repetition across TTIs, the UE 115 may not expect that the final multiplexed channel in Group B overlaps with any PUCCH in Group A.

Figure 2:
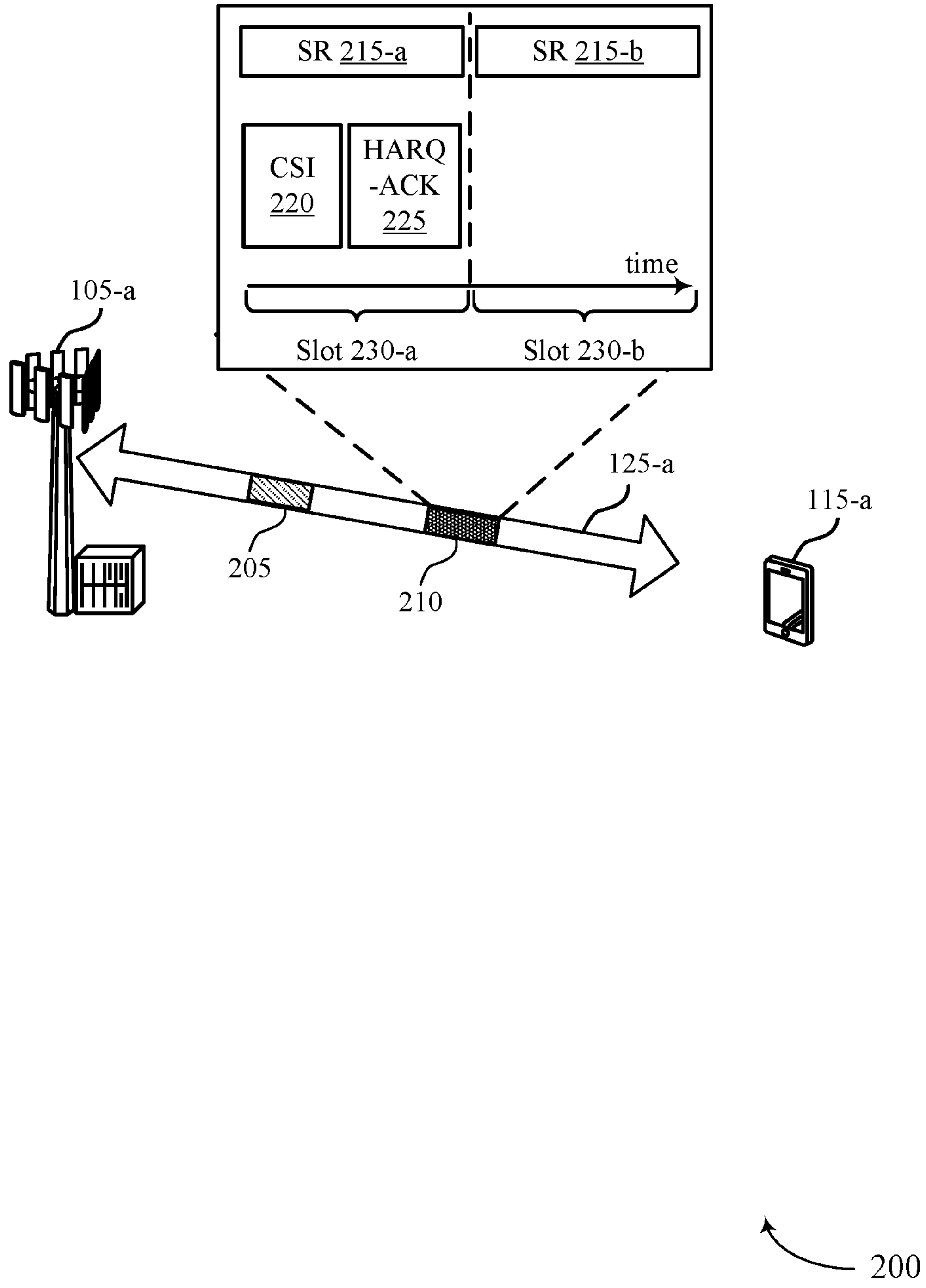
FIG. 2 illustrates an example of a wireless communications system that supports collision handling between PUCCH repetitions in accordance with one or more aspects of the present disclosure.

FIG. 2 illustrates an example of a wireless communications system 200 that supports collision handling between PUCCH repetitions in accordance with one or more aspects of the present disclosure. In some examples, the wireless communications system 200 may implement aspects of wireless communications system 100. The wireless communications system 200 may include a UE 115-*a*, which may be an example of a UE 115 as described herein. The wireless communications system 200 may include a network entity 105-*a*, which may be an example of a network entity 105 as described herein.

The UE 115-*a* may communicate with the network entity 105-*a* using a communication link 125-*a*, which may be an example of an NR or LTE link between the UE 115-*a* and the network entity 105-*a*. The communication link 125-*a* may include bi-directional links that enable both uplink and downlink communication. For example, the UE 115-*a* may transmit uplink signals, such as uplink control signals or uplink data signals, to the network entity 105-*a* using the communication link 125-*a* and the network entity 105-*a* may transmit downlink transmissions, such as downlink control signals or downlink data signals, to the UE 115-*a* using the communication link 125-*a*.

In some cases, the UE 115-*a* may receive, from the network entity 105-*a*, one or more control messages 205 that collectively schedule a number of overlapping PUCCHs 210 including at least one PUCCH with repetition across TTIs. For example, the one or more control messages 205 may collectively schedule a scheduling request 215 with repetition, a channel state information (CSI) report 220, and a HARQ acknowledgment 225, where the CSI report 220 and the HARQ acknowledgment 225 overlap with a first repetition of the scheduling request 215-*a*. For example, a first repetition of the scheduling request 215-*a*, the CSI report 220 and the HARQ acknowledgment 225 may be scheduled for transmission in a first slot 230-*a* and a second repetition of the scheduling request 215-*b* may be scheduled for transmission in a second slot 230-*b*. In some cases, different PUCCHs may be associated with TTIs of different lengths (e.g., some PUCCHs may be slot-based and some PUCCHs may be sub-slot based). When resolving PUCCHs, a UE 115-*a* may first associate PUCCHs to a same TTI length (e.g., by either associating the PUCCHs to the smallest TTI length or to the longest TTI length).

In some examples, all uplink control information (UCI) and physical uplink shared channel (PUSCH) transmissions may be defined to have the same priority level or index. In such examples, if a PUCCH overlaps with another PUCCH, and none of the overlapping PUCCHs are scheduled with repetition (e.g., if the scheduling request 215 was not scheduled with repetition), then the UE 115-*a* may multiplex the content of the overlapping PUCCHs into one PUCCH. The resulting PUCCH may be one of the overlapping PUCCHs, or a new PUCCH. In such examples, however, if any of the PUCCHs are with repetition (e.g., as illustrated in FIG. 2), the UE 115-*a* does not multiplex UCI on PUCCH repetitions, and the UE 115-*a* also does not multiplex the repeated UCI on any PUSCH. For example, the UE 115-*a* will not multiplex the CSI report 220 or the HARQ acknowledgment 225 with the scheduling request 215-*a* where the scheduling request 215-*a* is scheduled with repetitions. Instead, the UE 115-*a* switches to dropping and prioritization rules to resolve the collision by dropping the overlapping channel(s) that are deprioritized, and transmit the channels that are prioritized. In some cases, the rules may specify that a UE 115-*a* does not multiplex different UCI types in a PUCCH transmission with repetitions over $$N_{PUCCH}^{repeat} > 1 \text{ slots.}$$

The rules may specify that a HARQ acknowledgment has a higher priority level (e.g., a higher UCI type priority level) than a scheduling request, and a scheduling request has a higher priority level (e.g., a higher UCI type priority level) than a CSI report. The rules may specify that if a UE 115-*a* would transmit a first PUCCH over more than one slot and at least a second PUCCH over one or more slots, and the transmissions of the first PUCCH and the second PUCCH would overlap in a number of slots: 1) the UE 115-*a* does not expect the first PUCCH and any of the second PUCCHs to start at a same slot and include a UCI type with same priority; 2) if the first PUCCH and any of the second PUCCHs include a UCI type with same priority, the UE 115-*a* transmits the PUCCH starting at an earlier slot and does not transmit the PUCCH starting at a later slot; and 3) if the first PUCCH and any of the second PUCCHs do not include a UCI type with same priority, the UE 115-*a* transmits the PUCCH that includes the UCI type with higher priority and does not transmit the PUCCH that include the UCI type with lower priority. In some examples, the rules may specify that a UE 115-*a* would transmit a group of overlapping PUCCHs {Q(j−o+1) . . . Q(j)}(where Q is the set of PUCCHs, j is an of resources in the set Q, and o is a counter of overlapping resources) in a slot, and if at least one of the PUCCHs in the group is repeated over more than one slot, the UE 115-*a* may transmit the PUCCH with the highest priority in the group in the slot using procedures described herein, and may not transmit the other PUCCHs in the group.

In some examples, two priority levels for PUCCHs (associated with priority index 0, and 1, respectively, where 0 represents low priority, and 1 represents high priority) may be defined. In such examples, if a collision occurs between two PUCCH transmissions of different a priority (index), then UE 115-*a* cancels or partially cancels the low priority PUCCH, and transmits the high priority PUCCH on the overlapping portion of the slot. In such examples, the UE 115-*a* may multiplex overlapping PUCCHs of the same priority level. Cancellation includes partial cancelation of a PUCCH, while dropping refers to dropping of an entire PUCCH transmission. Cancellation accordingly includes stricter timeline constraints.

In some examples, a UE 115-*a* may multiplex UCI across different priority levels. In some examples, the general framework for intra-UE multiplexing when none of the overlapping PUCCHs are with repetition includes: 1) first resolving overlapping PUCCHs with the same priority index (where HARQ acknowledgments are higher priority than scheduling requests which are higher priority than CSI reports); and 2) then resolving overlapping PUCCHs with different priorities. The second step may involve resolving collisions of low priorities PUCCHs and high priority PUCCHs and resolving collisions of PUCCHs and PUSCHs of different priorities.

As illustrated in FIG. 2, in some cases, more than one PUCCH with repetition (e.g., scheduling request 215) may overlap with more than one single-slot PUCCH (e.g., HARQ acknowledgment 225 and CSI report 220). Current PUCCH conflict resolution rules may be unable to resolve the collisions between the PUCCHs without ambiguity (e.g., the network entity 105-*a* and the UE 115-*a* may not resolve the PUCCHs the same way). For example, the outcome of the conflict resolution depends on which order the UE 115-*a* processes the overlapping PUCCHs (the scheduling request 215-*a*, the HARQ acknowledgment 225, and CSI report 220). If the UE 115-*a* first resolves the collision between the scheduling request 215-*a* and the CSI report 220, then UE 115-*a* will drop the CSI report, since the scheduling request 215-*a* is higher priority than the CSI report 220. The UE 115-*a* would still need to resolve the collision between the scheduling request 215-*a* and HARQ acknowledgment 225. The scheduling request 215-*a* would be dropped as the HARQ acknowledgment 225 has a higher priority than the scheduling request 215-*a*, and therefore only the HARQ acknowledgment 225 would be transmitted by the UE 115-*a*. If however, the UE 115-*a* first resolves the collision between the scheduling request 215-*a* and the HARQ acknowledgment 225, then the UE 115-*a* would drop the scheduling request 215-*a*. The UE 115-*a* would then be able to transmit the HARQ acknowledgment 225 and the CSI report 220 because the HARQ acknowledgment 225 and CSI report 220 do not overlap.

Accordingly, techniques described herein manage scheduling collisions between PUCCH with repetitions and single-slot PUCCHs in a way that removes such ambiguity. The UE 115-*a* and the network entity 105-*a* may perform a multi-stage conflict resolution procedure based on the scheduling collision(s). As long as the UE 115-*a* and the serving network entity 105-*a* perform the same conflict resolution procedure, the UE 115-*a* and the serving network entity 105-*a* will reach the same determination in terms of which PUCCHs are prioritized.

In some examples. to do so, the UE 115-*a* may identify a group of PUCCHs scheduled with repetition (e.g., identified as a set A) and UE 115-*a* may identify the single-slot PUCCHs (e.g., identified as a set B). At a first stage, the UE 115-*a* may resolve collisions among the set A PUCCHs (e.g., among the set of PUCCHs scheduled with repetition). The result of the first stage may be a set of PUCCHs with repetition that do not overlap each other, denoted set A'. In a second stage, collisions between PUCCHs of the set A' and PUCCHs of the set B may be resolved, resulting in a set C of PUCCHs. The resolution of the second stage may be such that any overlapping PUCCHs in C are PUCCHs without repetition. In other words, in the second stage, any overlap between PUCCHs with repetition and PUCCHs without repetition may be resolved. In some examples, in each of the first stage and the second stage, the resolutions may be based on a priority level (e.g., based on the UCI type priority and/or the starting slot index) associated with each PUCCH. For example, for each collision involving at least one PUCCH with repetition, the PUCCH involved in the collision having a lower priority level may be dropped or canceled. In a third stage, collisions among PUCCHs in set C are resolved in order to achieve a set D of non-overlapping PUCCHs. In some examples, the resolution of the third stage may be such that overlapping single-slot PUCCHs with the same priority level may be multiplexed. In some examples, the resolution of the third stage may be such that for overlapping single-slot PUCCHs with different priority levels, the lower priority level PUCCH may be dropped or canceled. The UE 115-*a* may transmit the resolved set (set D) of PUCCHs 210 to the network entity 105-*a*. As the network entity 105-*a* also performs the same conflict resolution procedure, the network entity 105-*a* may expect to receive the resolved set (set D) of PUCCHs 210 from the UE 115-*a*.

In some examples, the UE 115-*a* may apply the first stage to all overlapping PUCCHs, regardless of whether the PUCCH is scheduled with or without repetition. In other words, the set A includes all of the PUCCHs. Accordingly, the UE 115-*a* may resolve collisions among the PUCCHs and generate a set of PUCCHs that do not overlap with each other. The UE 115-*a* may transmit the resolved set of PUCCHs to the network entity 105-*a*. As the network entity 105-*a* may perform a corresponding conflict resolution procedure, the network entity 105-*a* may expect to receive the resolved set of PUCCHs from the UE 115.

In some examples, the UE 115-*a* may identify one or more groups of overlapping PUCCHs, and then select the highest priority PUCCH from each group, and drop or cancel the other PUCCHs in each respective group. Within a given group, each PUCCH overlaps with at least another PUCCH, but in some examples not all PUCCHs in a group must overlap with all other PUCCHs in the group. Accordingly, overlaps between PUCCHs may be resolved and a resolved set of PUCCHs may be generated. The UE 115-*a* may transmit the resolved set of PUCCHs to the network entity 105-*a*. As the network entity 105-*a* may perform a corresponding conflict resolution procedure, the network entity 105-*a* may expect to receive the resolved set of PUCCHs from the UE 115-*a*.

For example, the UE 115-*a* may perform conflict resolution separately for each of the one or more groups after identifying the one or more group. If any PUCCH in a group is with repetition across multiple TTIs, the UE 115-*a* may select the PUCCH in the group having the highest priority level and drop the remaining PUCCHs. If none of the PUCCHS are scheduled with repetition across multiple TTIs, the UE 115-*a* may multiplex the group of PUCCHs. Accordingly, in some examples, multiplexing may be performed selectively in groups depending on whether a given group contains a PUCCH with repetition across TTIs.

In some cases, the UE may identify one or more groups of overlapping PUCCHs. In some examples, where there are multiple groups, the UE 115-*a* may apply conflict resolution using an ordering starting from the group that starts or ends the earliest in time to the group that starts or ends the latest in time. In some examples, where there are multiple groups, the UE 115-*a* may apply conflict resolution using an ordering starting from the group with a PUCCH with repetition across TTIs and then moving to a group without repetitions across TTIs. For example, the UE 115-*a* may perform conflict resolution first in groups with one or more PUCCHs with repetition across TTIs and then may perform conflict resolution in groups without a PUCCH with repetition across TTIs. In some examples, the UE 115-*a* may perform conflict resolution first in groups without a PUCCH with repetition across TTIs and then may perform conflict resolution in groups with one or more PUCCHs with repetition across TTIs.

In some examples, in the case that a first group (Group A) includes one or more PUCCHs with repetition across TTIs and a second group (Group B) does not include a PUCCH with repetition across TTIs, the UE 115-*a* may not expect that the final multiplexed channel in Group B overlaps with a PUCCH with repetition across TTIs in Group A, regardless of whether a PUCCH with repetition across TTIs in Group A will be dropped or not during the conflict resolution procedure in Group A. In some examples, in the case that a first group (Group A) includes one or more PUCCHs with repetition across TTIs and a second group (Group B) does not include a PUCCH with repetition across TTIs, the UE 115-*a* may not expect that the final multiplexed channel in Group B overlaps with any PUCCH in Group A.

Figure 3:
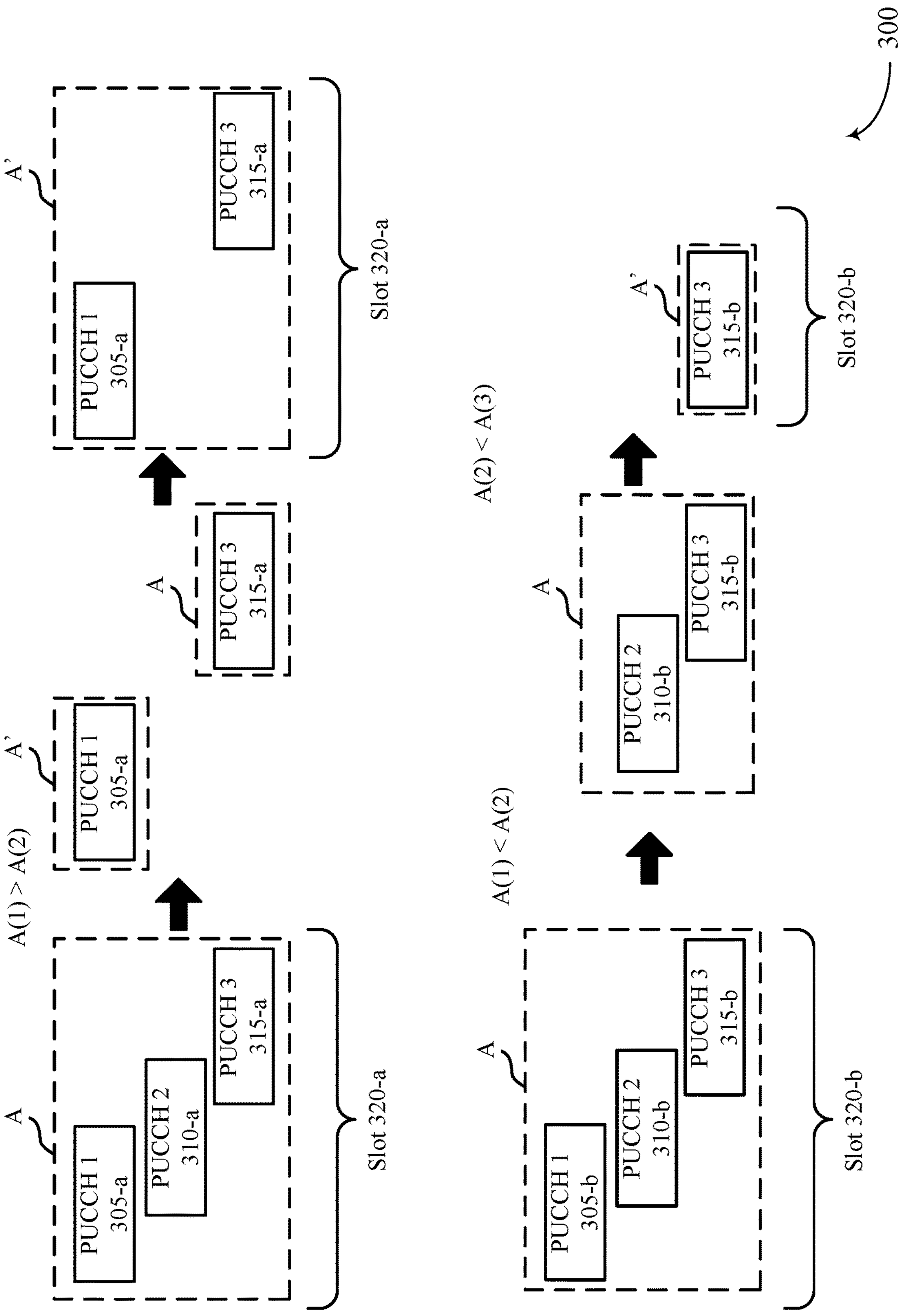
FIG. 3 illustrates an example of a stage of a multi-stage conflict resolution procedure that supports collision handling between PUCCH repetitions in accordance with one or more aspects of the present disclosure.

FIG. 3 illustrates an example of a stage of a multi-stage conflict resolution procedure 300 that supports collision handling between PUCCH repetitions in accordance with one or more aspects of the present disclosure. In some examples, the stage of a multi-stage conflict resolution procedure 300 may be implemented by aspects of the wireless communications systems 100 and 200. For example, the stage of a multi-stage conflict resolution procedure 300 may be a first stage of a multi-stage conflict resolution procedure for resolving collisions between PUCCHs involving at least one PUCCH scheduled with repetitions.

Assuming that, for an arbitrary set of PUCCH resources in a set Q of resources, there exists an order operation, denoted by order(Q) which could assign an ordered index 1,2,3, . . . to each PUCCH resource in the set Q. For example, the multi-stage conflict resolution procedure denotes c(Q) to be the cardinality of the set Q, and Q(m), m=1, . . . c(X), to be the m-th PUCCH resource in Q according to the determined order. For a set Q of PUCCH resources, the PUCCH resources may be ordered according to: 1) the order of the resources in time (e.g., a resource with earlier first symbol is placed before a resource with later first symbol); 2) duration (e.g., for two resources with same first symbol, the resource with longer duration is placed before the resource with shorter duration); or 3) arbitrarily (e.g., for two resources with same first symbol and same duration, the placement may be arbitrary). Other order operations or orders may be used for the purpose of PUCCH conflict resolution. The UE 115 and the network entity 105 may agree on the order of PUCCH resources.

At a first step of the stage of a multi-stage conflict resolution procedure 300, the multi-stage conflict resolution procedure initializes a set A' to be an empty set, where set A denotes the set of PUCCHs in a slot 320 with repetition. If c(A)=1, the procedure includes the resource A(1) into A' (e.g., set A'=A' ∪{A(1)}), and end the procedure; otherwise the procedure orders the PUCCH channels in set A according to order(A). The procedure checks if A(1) overlaps with A(2) (where A(1) and A(2) denote the first and second elements in the set A). If A(1) overlaps with A(2), then the procedure removes the one that has a lower priority (e.g., according to UCI type or a priority index) from the set A. If A(1) does not overlap with A(2), the procedure includes A(1) in set A' (e.g., set A'=A' ∪{A(1)}), and removes A(1) from set A (e.g., set A=A {A(1)}). The procedure repeats the steps of the first stage of a multi-stage conflict resolution procedure 300 on the remaining PUCCHs in set A recursively until there is only one PUCCH left in set A, in which case the one PUCCH in set A may be included in set A'. The procedure then moves to the second stage of the multi-stage conflict resolution procedure.

For example, as shown in FIG. 3, PUCCH 305-*a*, PUCCH 310-*a*, and PUCCH 315-*a* may be scheduled in a slot 320-*a*. Each of PUCCH 305-*a*, PUCCH 310-*a*, and PUCCH 315-*a* are scheduled with repetition across slots. PUCCH 305-*a* overlaps with PUCCH 310-*a* and PUCCH 310-*a* overlaps with PUCCH 315-*a*. At the first stage of the multi-stage conflict resolution procedure, PUCCH 305-*a*, PUCCH 310-*a*, and PUCCH 315-*a* are denoted as a set A and ordered (PUCCH 305-*a* corresponds to A(1), PUCCH 310-*a* corresponds to A(2), and PUCCH 315-*a* corresponds to A(3)). The priority of PUCCH 305-*a* is compared to the priority of PUCCH 310-*a*. As shown, PUCCH 305-*a* has a higher priority level than PUCCH 310-*a*. Accordingly, PUCCH 310-*a* is dropped. PUCCH 305-*a* and PUCCH 315-*a* do not overlap. Accordingly, the set A' for slot 320-*a* includes PUCCH 305-*a* and PUCCH 315-*a*.

As another example, as shown in FIG. 3, PUCCH 305-*b*, PUCCH 310-*b*, and PUCCH 315-*b* may be scheduled in a slot 320-*b*. Each of PUCCH 305-*b*, PUCCH 310-*b*, and PUCCH 315-*b* are scheduled with repetition across slots. PUCCH 305-*b* overlaps with PUCCH 310-*b* and PUCCH 310-*b* overlaps with PUCCH 315-*b*. At the first stage of the multi-stage conflict resolution procedure, PUCCH 305-*b*, PUCCH 310-*b*, and PUCCH 315-*b* are denoted as a set A and ordered (PUCCH 305-*b* corresponds to A(1), PUCCH 310-*b* corresponds to A(2), and PUCCH 315-*b* corresponds to A(3)). The priority of PUCCH 305-*b* is compared to the priority of PUCCH 310-*b*. As shown, PUCCH 305-*b* has a lower priority level than PUCCH 310-*b*. Accordingly, PUCCH 305-*b* is dropped. PUCCH 310-*b* overlaps with PUCCH 315-*b*. As shown PUCCH 310-*b* has a lower priority than PUCCH 315-*b*, and accordingly PUCCH 310-*b* is dropped. Accordingly, the set A' for slot 320-*b* includes PUCCH 315-*b*.

Figure 4:
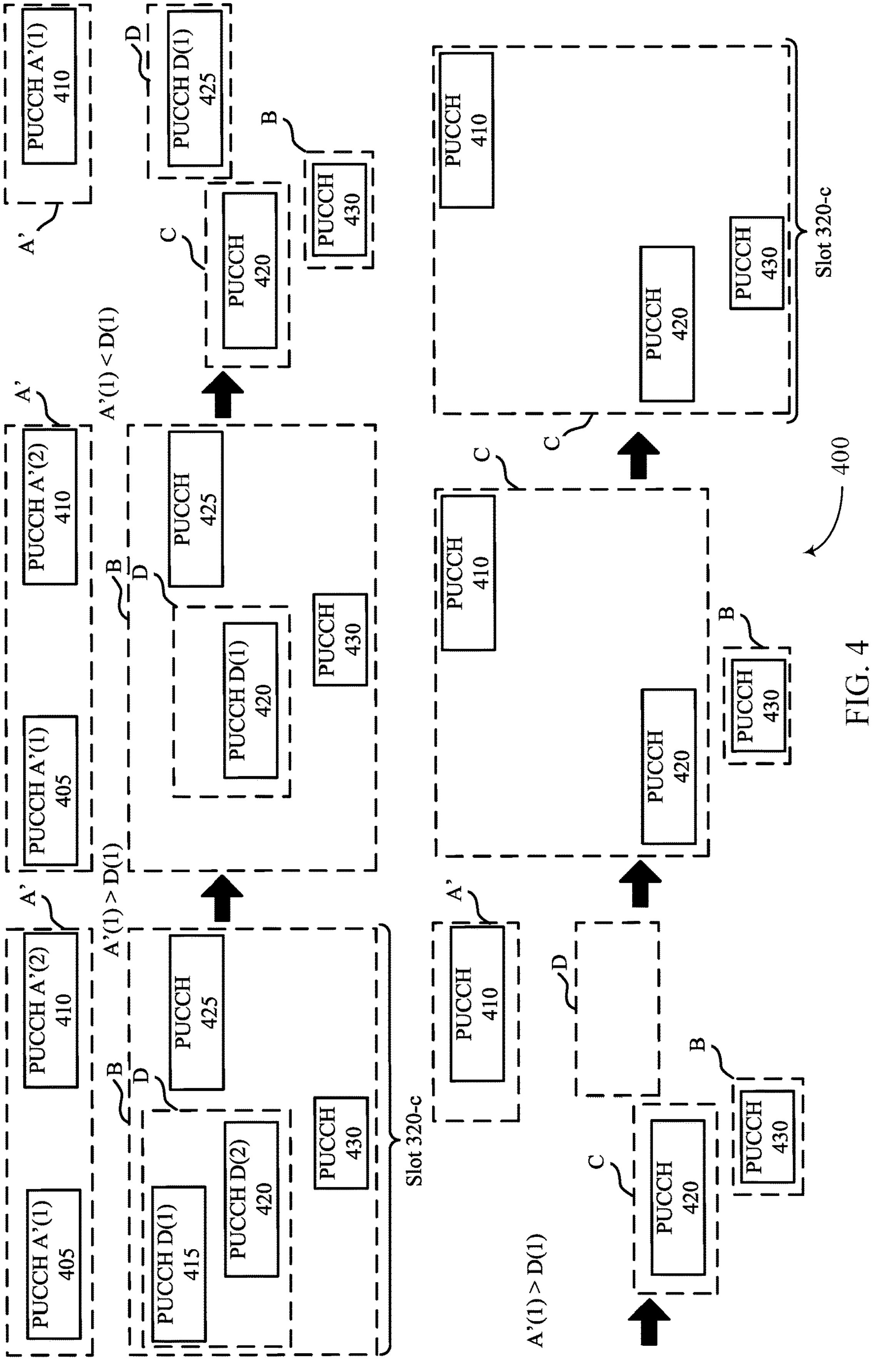
FIG. 4 illustrates an example of a stage of a multi-stage conflict resolution procedure that supports collision handling between PUCCH repetitions in accordance with one or more aspects of the present disclosure.

FIG. 4 illustrates an example of a stage of a multi-stage conflict resolution procedure 400 that supports collision handling between PUCCH repetitions in accordance with one or more aspects of the present disclosure. In some examples, the stage of a multi-stage conflict resolution procedure 400 may be implemented by aspects of the wireless communications systems 100 and 200. For example, the stage of a multi-stage conflict resolution procedure 400 may be a second stage of a multi-stage conflict resolution procedure for resolving collisions between PUCCHs involving at least one PUCCH scheduled with repetitions.

The first stage of the multi-stage conflict resolution procedure generates a set A' of PUCCHs with repetition in which none of the PUCCHs in A' overlap. The second stage of the multi-stage conflict resolution procedure resolves conflicts between PUCCHs of the set A' and single-slot PUCCHs, which are designated as a set B. The second stage generates a set C of PUCCHs on which no PUCCHs with repetition overlap with any other PUCCH.

At a first step of the second stage, set C is initialized and set D is set as an empty set, and set A' and B are taken as inputs. If A' is an empty set (e.g., there are no PUCCHs with repetition), then all PUCCHs in set B are included into set C and the second stage is completed (i.e., set C=C∪B). Otherwise, the procedure orders the PUCCHs in set A' and at a second step, identifies the subset of PUCCHs in set B that overlap with the PUCCH A'(1), which subset is denoted as set D, and set B=B/D (meaning that the subset of elements in set D are removed from set B). If set D is an empty set, then A'(1) is included in set C (e.g., set C=C∪A'(1)) and A'(1) is removed from set A', and the procedure returns to the second step of the second stage (e.g., after removing A'(1) from set A', the procedure identifies the subset of PUCCHs in set B that overlap with the new PUCCH A'(1)). If set A' and set D are not empty, then set D is ordered. Next, the procedure checks for an overlap between A'(1) and D(1). If there is an overlap, and if and if A'(1)<D(1) (meaning that A'(1) has a lower priority than D(1)), then A'(1) is removed from set A', D is placed back in set B (e.g., set B=B∪D) and the procedure returns to the second step of the second stage. If there is an overlap and if A'(1)>D(1) (meaning that A'(1) has a higher priority than D(1)), then D(1) is removed from set D, and the procedure returns to the second step of the second stage and repeats the process until all overlaps between set A' and set B are resolved. A'(1) may not have an equal priority level as D(1).

Accordingly, set C, the output of the second stage, includes a set of PUCCHs where the overlaps may only involve single-slot PUCCHs. At a third stage of the multi-stage conflict resolution procedure, overlapping single-slot PUCCHs may be resolved by multiplexing overlapping single-slot PUCCHs with the same priority level or dropping or cancelling the lower priority single-slot PUCCHs.

For example, as shown in FIG. 4, for a slot 320-*c*, the set A' of PUCCHs with repetition may include a PUCCH 405 and a PUCCH 410 (where PUCCH 405 is initially ordered as A'(1) and PUCCH 410 is ordered as A'(2)). The set B of single-slot PUCCHs includes PUCCH 415, PUCCH 420, PUCCH 425, and PUCCH 430. The procedure denotes set D as including PUCCH 415 and PUCCH 420 as PUCCH 415 and PUCCH 420 overlap with PUCCH 405 (A'(1)). Set D is ordered as PUCCH 415 corresponding to D(1) and PUCCH 420 corresponding to D(2). In the example of FIG. 4, PUCCH 405 has a higher priority level than PUCCH 415 (A'(1)>D(1)), and accordingly PUCCH 415 is dropped or canceled. PUCCH 420 is then reordered as D(1). In the example of FIG. 4, PUCCH 405 has a lower priority level than PUCCH 420 (A'(1)<D(1)), and accordingly PUCCH 405 is dropped or canceled. PUCCH 420 is then included into set C. Set A' is then reordered and PUCCH 410 corresponds to A'(1). The procedure denotes a new set D as PUCCH 425, which overlaps with PUCCH 410 (A'(1)). In the example of FIG. 4, PUCCH 410 has a higher priority level than PUCCH 425 (A'(1)>D(1)), and accordingly PUCCH 425 is dropped or canceled. PUCCH 410 is then added to set C. PUCCH 430 does not overlap with PUCCH 410, and accordingly, PUCCH 30 is added to set C. The set C then includes no PUCCHs with repetition that overlap with any other PUCCH.

Figure 5:
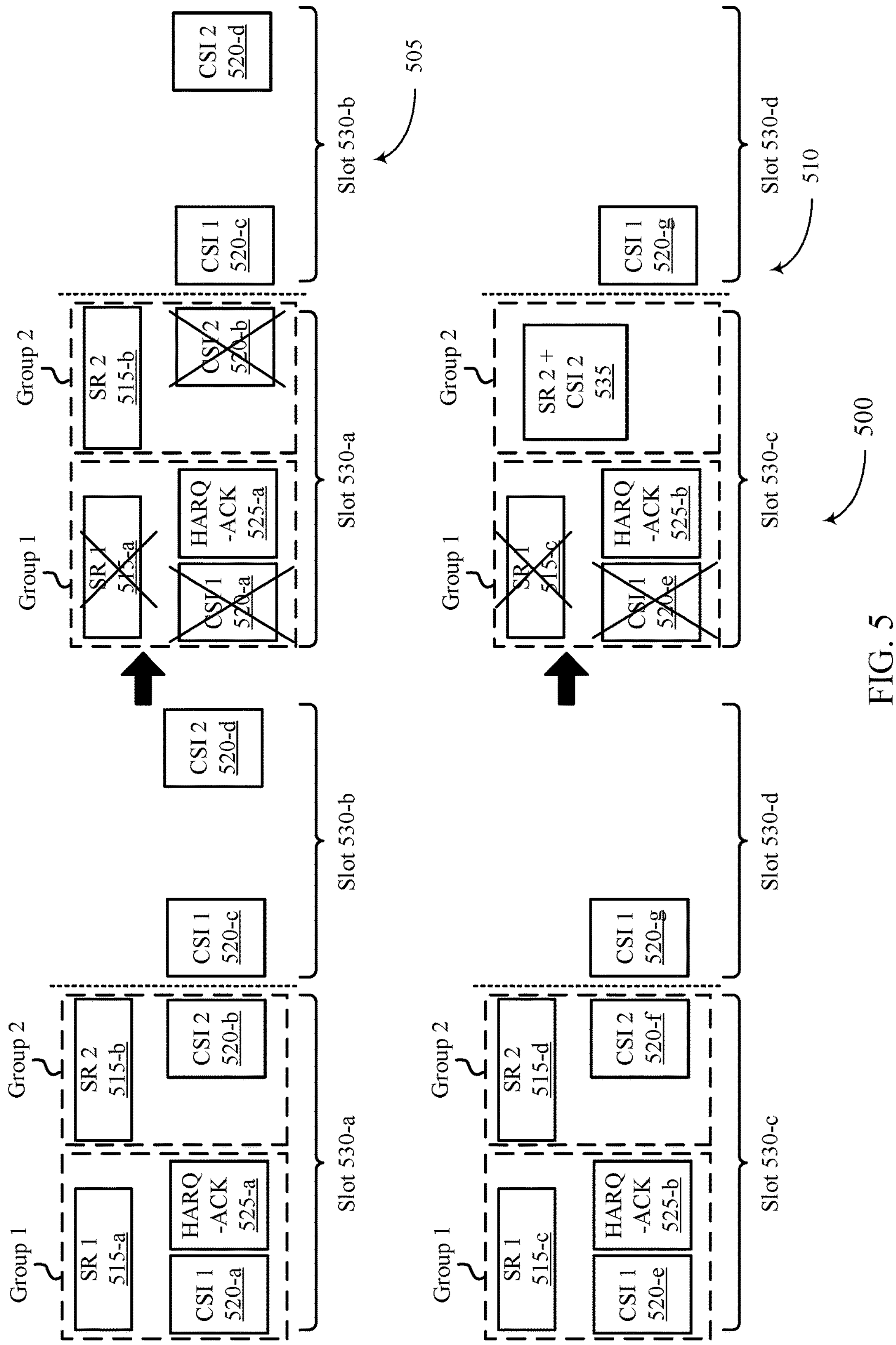
FIG. 5 illustrates examples of a multi-stage conflict resolution procedure that supports collision handling between PUCCH repetitions in accordance with one or more aspects of the present disclosure.

FIG. 5 illustrates an example of a conflict resolution procedure 500 that supports collision handling between PUCCH repetitions in accordance with one or more aspects of the present disclosure. In some examples, the conflict resolution procedure 500 may be implemented by aspects of the wireless communications systems 100 and 200.

In example 505, in a first slot 530-*a*, a UE 115 may be scheduled with a first scheduling request 515-*a* that overlaps with a first CSI report 520-*a* and a HARQ acknowledgment 525-*a*, and a second scheduling request 515-*b* that overlaps with a second CSI report 520-*b*. The first CSI report 520-*a* and the second CSI report 520-*b* may be scheduled with repetition (e.g., the first CSI report 520-*c* and the second CSI report 520-*d* may be transmitted in the slot 530-*b*). The UE 115 may identify groups of overlapping PUCCHs. For example, Group 1 may include the first scheduling request 515-*a* that overlaps with the first CSI report 520-*a* and the HARQ acknowledgment 525-*a*, and Group 2 may include the second scheduling request 515-*b* that overlaps with the second CSI report 520-*b*.

In example 510, in a first slot 530-*c*, a UE 115 may be scheduled with a first scheduling request 515-*c* that overlaps with a first CSI report 520-*e* and a HARQ acknowledgment 525-*b*, and a second scheduling request 515-*b* that overlaps with a second CSI report 520-*f*. The first CSI report 520-*e* may be scheduled with repetition (e.g., the first CSI report 520-*g* may be transmitted in the slot 530-*d*). The UE 115 may identify groups of overlapping PUCCHs. For example, Group 1 may include the first scheduling request 515-*c* that overlaps with the first CSI report 520-*e* and the HARQ acknowledgment 525-*b*, and Group 2 may include the second scheduling request 515-*d* that overlaps with the second CSI report 520-*f*.

The UE 115 may use a defined procedure for grouping PUCCHs. For example, in a set Q of PUCCHs, an index j of resources in the set Q may be set to "0". A counter o of overlapping resources may be set to "0". C(Q) refers to the cardinality of set Q. While j≤C(Q)−1, if j<C(Q)−1, and resource Q(j−o) overlaps with resource Q(j+1), then o=o+1 and j=j+1, else while the UE 115 determines {Q(j−o), Q(j−o+1) . . . Q(j)} as a group and j=j+1.

For example, with respect to example 505, the UE 115 may cancel the first scheduling request 515-*a* and the first CSI report 520-*a* and transmit the HARQ acknowledgment 525-*a* in Group 1 as the HARQ acknowledgment 525-*a* may be associated with a higher priority level than the first scheduling request 515-*a* and the first CSI report 520-*a*. In Group 2, the UE 115 may cancel the second CSI report 520-*b* and transmit the second scheduling request 515-*b* as the second scheduling request 515-*b* may be associated with a higher priority level than the second CSI report 520-*b*.

As another example, with respect to example 510, the UE 115 may cancel the first scheduling request 515-*c* and the first CSI report 520-*e* and transmit the HARQ acknowledgment 525-*b* in Group 1 as the HARQ acknowledgment 525-*b* may be associated with a higher priority level than the first scheduling request 515-*c* and the first CSI report 520-*e*. In Group 2, the UE 115 may multiplex the second scheduling request 515-*d* and the second CSI report 520-*f* into a single PUCCH transmission 535 as neither the second scheduling request 515-*d* nor the second CSI report 520-*f* is scheduled with repetition (e.g., neither the second scheduling request 515-*d* nor the second CSI report 520-*f* is scheduled with a repetition in slot 530-*d*.)

In Group 2 of example 510, neither of the second scheduling request 515-*d* nor the second CSI report 520-*f* are scheduled with repetition, and accordingly may be multiplexed, while in Group 2 of example 505, the second CSI report 520-*b* is scheduled with repetition in slot 530-*b* (as second CSI report 520-*d*), and accordingly the UE 115 may not multiplex the second scheduling request 515-*b* and the second CSI report 520-*b*. As shown, in Group 2 of example 505, the UE 115 may apply dropping or canceling rules, and accordingly may cancel the second CSI report 520-*b* associated with a lower priority level than the second scheduling request 515-*b*.

Figure 6:
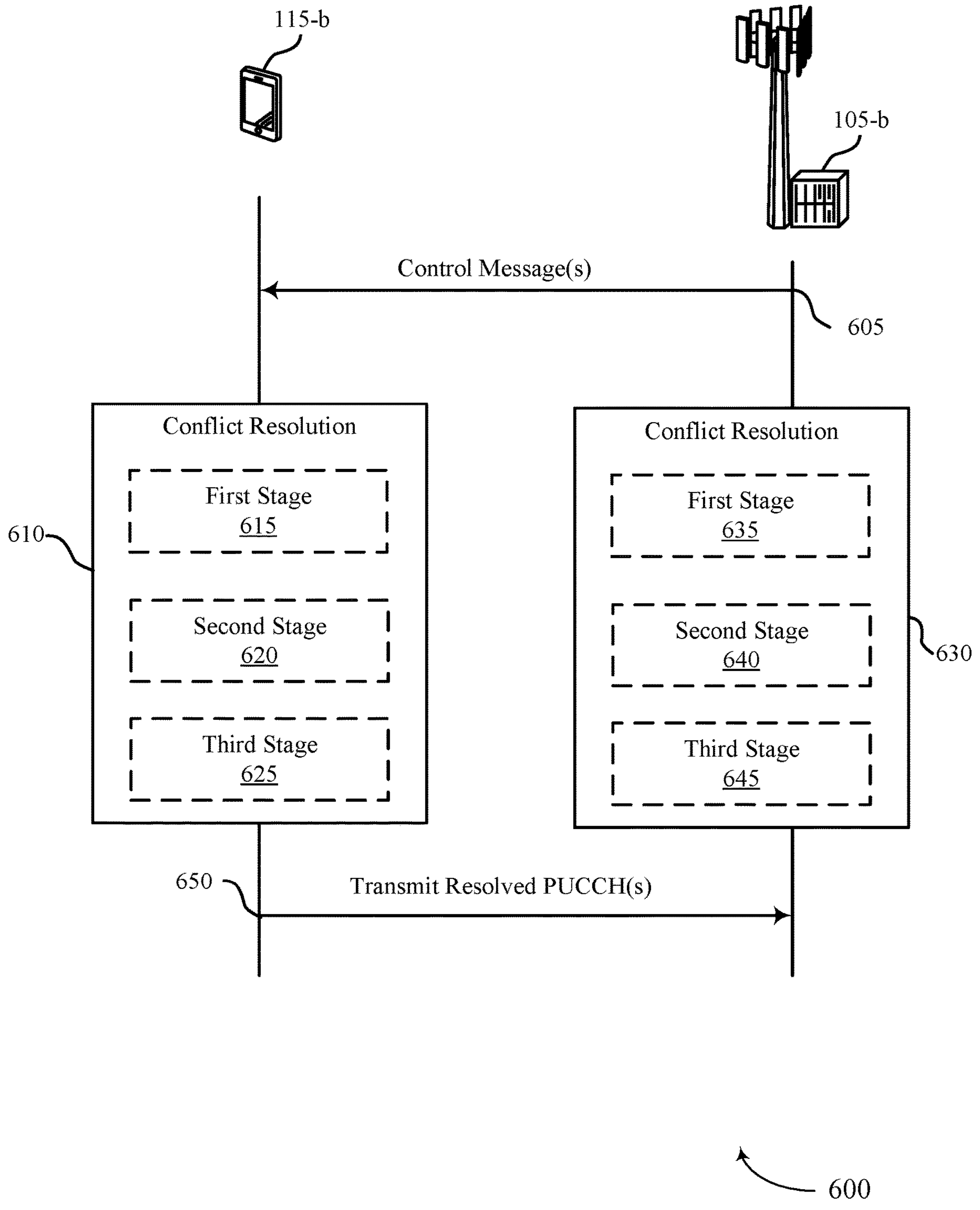
FIG. 6 illustrates an example of a process flow that supports collision handling between PUCCH repetitions in accordance with one or more aspects of the present disclosure.

FIG. 6 illustrates an example of a process flow 600 that supports collision handling between PUCCH repetitions in accordance with one or more aspects of the present disclosure. In some examples, the process flow 600 may implement aspects of wireless communications systems 100 or 200. The process flow 600 may include a UE 115-*b*, which may be an example of a UE 115 as described herein. The process flow 600 may include a network entity 105-*b*, which may be an example of a network entity 105 as described herein. In the following description of the process flow 600, the operations between the network entity 105-*b* and the UE 115-*b* may be transmitted in a different order than the example order shown, or the operations performed by the network entity 105-*b* and the UE 115-*b* may be performed in different orders or at different times. Some operations may also be omitted from the process flow 600, and other operations may be added to the process flow 600.

At 605, the UE 115-*b* may receive, from the network entity 105-*b*, one or more control messages that collectively schedule three or more uplink control channels involving two or more scheduling overlaps between the three or more uplink control channels, at least one of the three or more uplink control channels scheduled with repetition across multiple TTIs.

At 610, the UE 115-*b* may perform a conflict resolution procedure to resolve the two or more scheduling overlaps, the conflict resolution procedure based at least in part on an order for resolving scheduling overlaps between the three or more uplink control channels. In some examples, at 610, the UE 115-*b* may determine, from the three or more uplink control channels, a first set of uplink control channels with repetition across multiple TTIs and a second set of uplink control channels, each of the second set of uplink control channels scheduled for transmission within a respective single TTI.

In some examples, the conflict resolution procedure at 610 may include a first stage, a second stage, and a third stage. At 615, at the first stage, the UE 115-*b* may resolve first scheduling overlaps between uplink control channels of the first set of uplink control channels to generate a subset of the first set of uplink control channels. In some cases, if the three or more uplink control channels are all uplink control channels scheduled with repetition across multiple TTIs, the subset of the first set of uplink control channels is a resolved set of uplink control channels, and the UE 115-*b* may omit the second and third stages. In some examples, if only one uplink control channel of the three or more uplink control channels is scheduled with repetition across multiple TTIs, the UE 115-*b* may omit the first stage (as there are no scheduling overlaps between uplink control channels scheduled with repetition across multiple TTIs), and accordingly the subset of the first set of uplink control channels includes the one uplink control channel scheduled with repetition across multiple TTIs. At 620, at the second stage, the UE 115-*b* may resolve second scheduling overlaps between uplink control channels of the subset of the first set of uplink control channels and uplink control channels of the second set of uplink control channels to generate a third set of uplink control channels. At 625, at the third stage, the UE 115-*b* may resolve third scheduling overlaps between uplink control channels associated with single TTIs of the third set of uplink control channels to generate the resolved set of uplink control channels.

At 630, the network entity 105-*b* may perform a conflict resolution procedure corresponding to the conflict resolution procedure performed by the UE 115-*b* at 610. For example, the conflict resolution procedure at 630 may include a first stage, a second stage, and a third stage. For example, the network entity 105-*b* may determine, from the three or more uplink control channels, a first set of uplink control channels with repetition across multiple TTIs and a second set of uplink control channels, each of the second set of uplink control channels scheduled for transmission within a respective single TTI. At 635, at the first stage, the network entity 105-*b* resolves first scheduling overlaps between uplink control channels of the first set of uplink control channels to generate a subset of the first set of uplink control channels. At 640, at the second stage, the network entity 105-*b* resolves second scheduling overlaps between uplink control channels of the subset of the first set of uplink control channels and uplink control channels of the second set of uplink control channels to generate a third set of uplink control channels. At 645, at the third stage, the network entity 105-*b* resolves third scheduling overlaps between uplink control channels associated with single TTIs of the third set of uplink control channels to generate the resolved set of uplink control channels.

At 650, the UE 115-*b* transmits the resolved set of uplink control channels from the three or more uplink control channels based on the conflict resolution procedure.

In some examples, resolving the first scheduling overlaps between uplink control channels of the first set of uplink control channels at 615 and/or 635 includes generating an ordering of the first set of uplink control channels, where the order includes the ordering, and resolving the first scheduling overlaps between uplink control channels of the first set of uplink control channels based on the ordering and a priority level associated with each uplink control channel of the first set of uplink control channels. In some examples, resolving the first scheduling overlaps between uplink control channels of the first set of uplink control channels based on the priority level associated with each uplink control channel of the first set of uplink control channels includes canceling, for each first scheduling overlap, an uplink control channel of the first set of uplink control channels associated with a lower priority level.

In some examples, resolving the second scheduling overlaps between uplink control channels of the subset of the first set of uplink control channels and uplink control channels of the second set of uplink control channels at 620 and/or 640 includes generating a second ordering of the subset of the first set of uplink control channels and a third ordering of the second set of uplink control channels, where the order includes the second ordering and the third ordering, and resolving the second scheduling overlaps between uplink control channels of the subset of the first set of uplink control channels and uplink control channels of the second set of uplink control channels based on the second ordering, the third ordering, and a priority level associated with each uplink control channel of the subset of the first set of uplink control channels and each uplink control channel of the second set of uplink control channels. In some examples, resolving the second scheduling overlaps between uplink control channels of the subset of the first set of uplink control channels and uplink control channels of the second set of uplink control channels based on the priority level associated with each uplink control channel of the subset of the first set of uplink control channels and each uplink control channel of the second set of uplink control channels includes canceling, for each second scheduling overlap, an uplink control channel of the subset of the first set of uplink control channels or an uplink control channel of the second set of uplink control channels associated with a lower priority level.

In some examples, the UE 115-*b* may receive, from the network entity 105-*b*, control signaling indicating the priority level associated with each uplink control channel of the first set of uplink control channels and each uplink control channel of the second set of uplink control channels.

In some examples, the priority level associated with each uplink control channel of the first set of uplink control channels and each uplink control channel of the second set of uplink control channels is based on a type of transmission associated with each uplink control channel of the first set of uplink control channels and each uplink control channel of the second set of uplink control channels. In some examples, CSI transmissions are associated with a first priority level, scheduling request transmissions are associated with a second priority level higher than the first priority level, and HARQ messages are associated with a third priority level higher than the second priority level.

In some examples, resolving the third scheduling overlaps between uplink control channels associated with single TTIs of the third set of uplink control channels at 625 and/or 645 includes multiplexing, for each third scheduling overlap, the respective associated uplink control channels.

In some examples, the UE 115-*b* may receive, from the network entity 105-*b*, control signaling configuring the conflict resolution procedure.

In some examples, at 610 and 630, the UE 115-*b* and the network entity 105-*b* may apply the first stage 615 and the first stage 635, respectively, to all overlapping PUCCHs, regardless of whether the PUCCH is scheduled with or without repetition. Accordingly, the UE 115-*b* may resolve collisions among the PUCCHs and generate a set of PUCCHs that do not overlap with each other. The UE 115-*b* may transmit the resolved set of PUCCHs to the network entity 105-*b*. As the network entity 105-*b* may perform a corresponding conflict resolution procedure, the network entity 105-*b* may expect to receive the resolved set of PUCCHs from the UE 115.

In some examples, at 610 and 630, the UE 115-*b* and the network entity 105-*b* may identify one or more groups of overlapping PUCCHs, and then select the highest priority PUCCH from each group, and drop or cancel the other PUCCHs in each respective group. Accordingly, overlaps between PUCCHs may be resolved and a resolved set of PUCCHs may be generated. In some examples, the priority level is based on a type of transmission associated with each PUCCH (e.g., CSI transmissions may be associated with a first priority level, scheduling request transmissions may be associated with a second priority level higher than the first priority level, and HARQ messages may be associated with a third priority level higher than the second priority level) and a scheduled starting time of each PUCCH (e.g., for overlapping PUCCH of the same transmission type, the PUCCH with the earlier scheduled starting symbol may have a higher priority). In some examples, the one or more groups of overlapping PUCCHs may be identified by identifying an earliest scheduled PUCCH with an overlap, and then identifying all of the PUCCHs that overlap with that PUCCH, and so on to identify the groups of overlapping PUCCHs.

In some examples, the order may be based on the scheduled timing of the PUCCHs (e.g., the starting symbol of the PUCCHs) and the durations of the PUCCHs (e.g., for two PUCCHs with a same starting symbol, the order may be based on the PUCCH with the longer duration).

In some examples, performing the conflict resolution procedure at 610 and 630 includes, at the first stage at 615 and 635, resolving first scheduling overlaps between uplink control channels of the first set of uplink control channels and second scheduling overlaps between uplink control channels of the first set of uplink control channels and the second set of uplink control channels to generate a third set of uplink control channels, and at the second stage at 620 and 640, resolving third scheduling overlaps between uplink control channels associated with single transmission time intervals of the third set of uplink control channels to generate the resolved set of uplink control channels. In some examples, resolving the first scheduling overlaps and the second scheduling overlaps at the first stage at 615 and 635 may include generating an ordering of the first set of uplink control channels and the second set of uplink control channels, where the order includes the ordering; and resolving the first scheduling overlaps and the second scheduling overlaps based on the ordering and a priority level associated with each uplink control channel of the first set of uplink control channels and the second set of uplink control channels. In some examples, resolving the first scheduling overlaps and the second scheduling overlaps based on the priority level associated with each uplink control channel of the first set of uplink control channels and the second set of uplink control channels includes canceling, for each first scheduling overlap and for each second scheduling overlap, an uplink control channel associated with a lower priority level. In some examples, the priority level may be based on a type of transmission associated with each uplink control channel and a scheduled starting time of each uplink control channel. In some examples, a first uplink control channel having a higher uplink control information type priority may have a higher priority level than a second uplink control channel having a lower uplink control information type priority and a third uplink control channel having the same higher uplink control information type priority as the first uplink control channel may have a higher priority level based on the third uplink control channel having an earlier starting slot than the first uplink control channel. In some examples, the third set of uplink control channels includes no scheduling overlaps involving an uplink control channel scheduled with repetition across multiple transmission time intervals.

Figure 7:
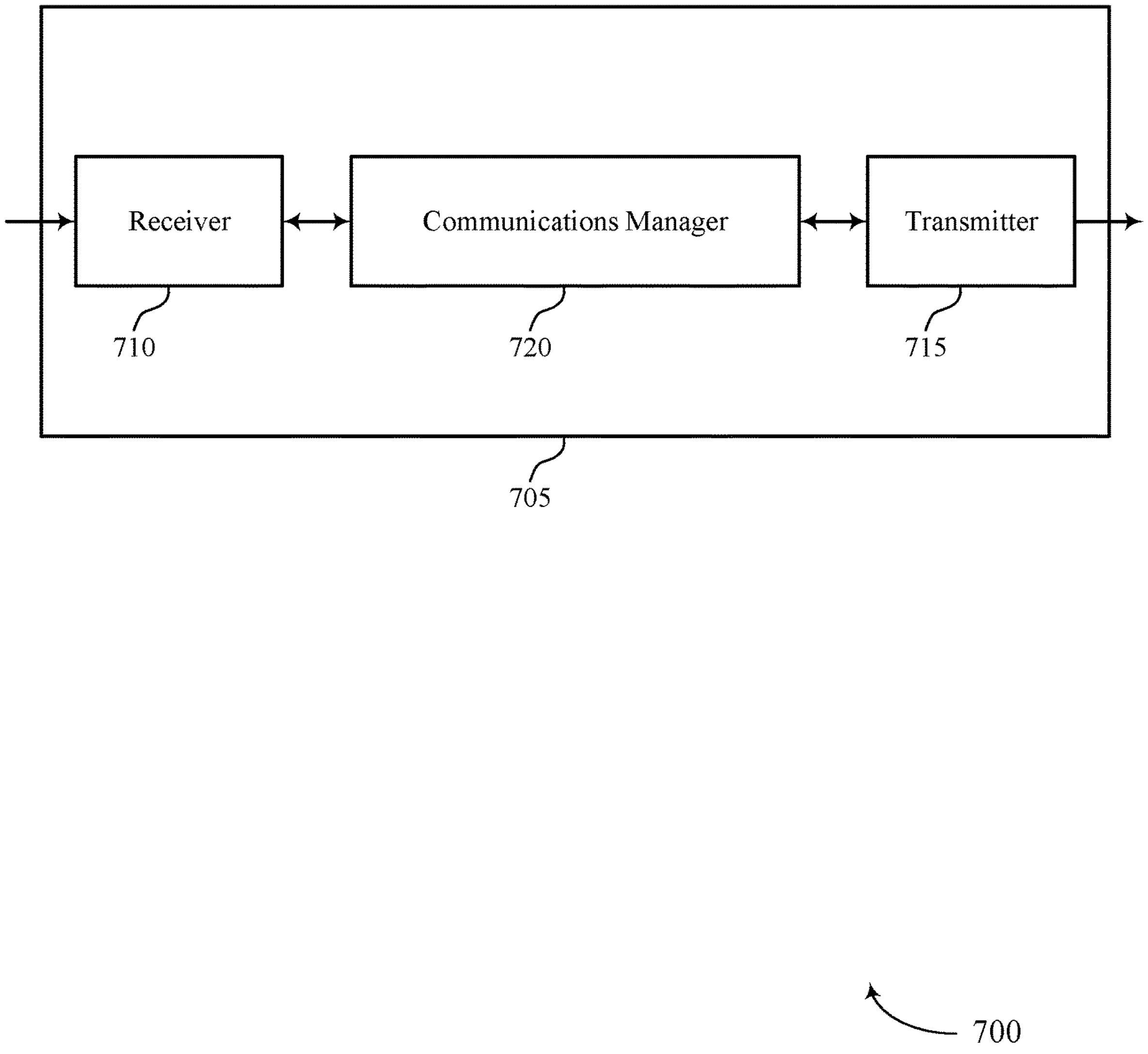
FIGS. 7 and 8 show block diagrams of devices that support collision handling between PUCCH repetitions in accordance with one or more aspects of the present disclosure.

FIG. 7 shows a block diagram 700 of a device 705 that supports collision handling between PUCCH repetitions in accordance with one or more aspects of the present disclosure. The device 705 may be an example of aspects of a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to collision handling between PUCCH repetitions). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to collision handling between PUCCH repetitions). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of collision handling between PUCCH repetitions as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 720, the receiver 710, the transmitter 715, or various combinations or components thereof may be implemented in code (e.g., as communications management software or firmware) executed by a processor. If implemented in code executed by a processor, the functions of the communications manager 720, the receiver 710, the transmitter 715, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 720 may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communications at a UE in accordance with examples as disclosed herein. For example, the communications manager 720 may be configured as or otherwise support a means for receiving, from a network entity, one or more control messages that collectively schedule three or more uplink control channels involving two or more scheduling overlaps between the three or more uplink control channels, at least one of the three or more uplink control channels scheduled with repetition across multiple TTIs. The communications manager 720 may be configured as or otherwise support a means for performing a conflict resolution procedure to resolve the two or more scheduling overlaps, the conflict resolution procedure based at least in part on an order for resolving scheduling overlaps between the three or more uplink control channels. The communications manager 720 may be configured as or otherwise support a means for transmitting a resolved set of uplink control channels from the three or more uplink control channels based at least in part on the conflict resolution procedure.

By including or configuring the communications manager 720 in accordance with examples as described herein, the device 705 (e.g., a processor controlling or otherwise coupled with the receiver 710, the transmitter 715, the communications manager 720, or a combination thereof) may support techniques for managing overlapping PUCCH involving repetitions, which may support more efficient utilization of communication resources.

Figure 8:
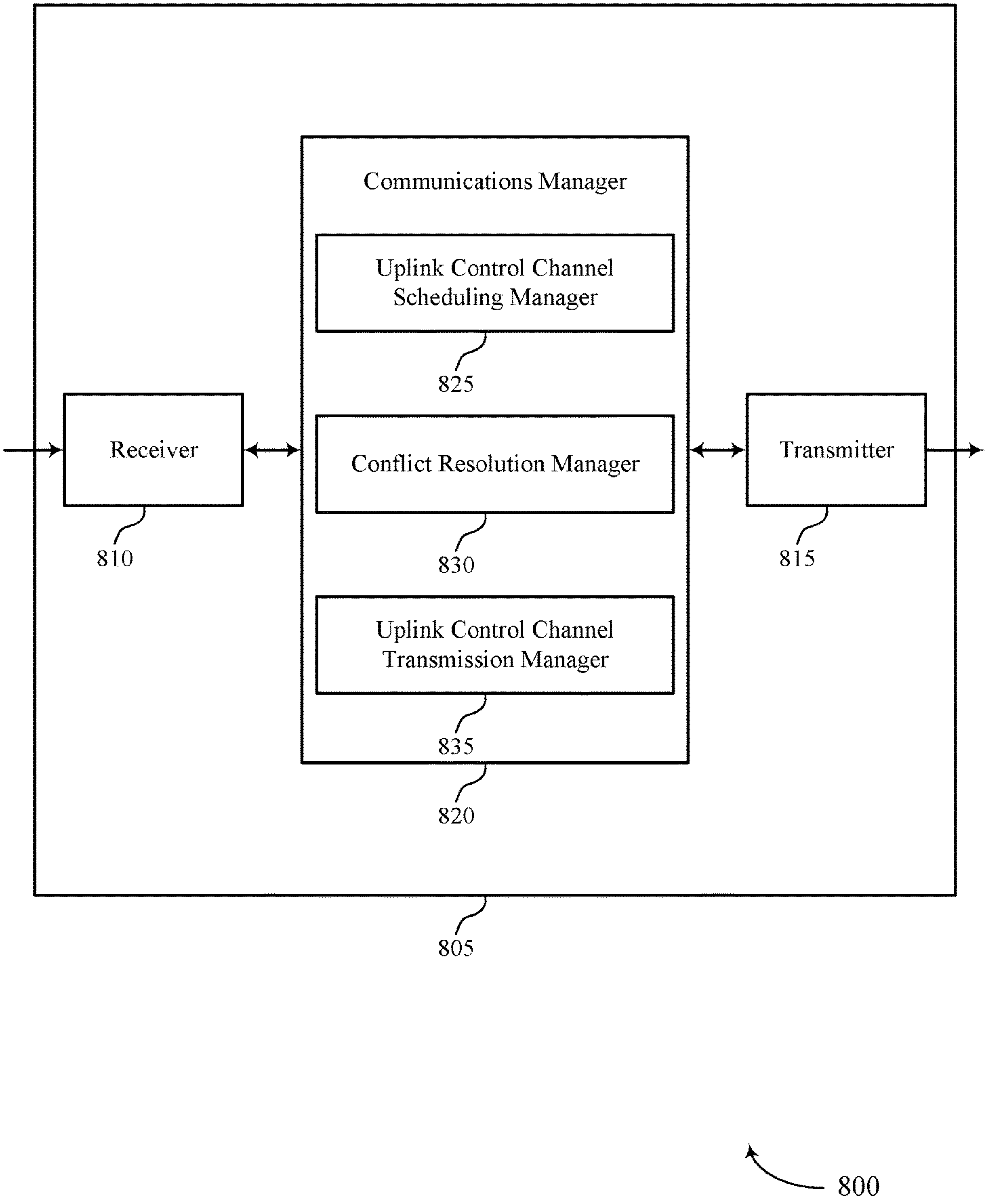

FIG. 8 shows a block diagram 800 of a device 805 that supports collision handling between PUCCH repetitions in accordance with one or more aspects of the present disclosure. The device 805 may be an example of aspects of a device 705 or a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to collision handling between PUCCH repetitions). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to collision handling between PUCCH repetitions). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of collision handling between PUCCH repetitions as described herein. For example, the communications manager 820 may include an uplink control channel scheduling manager 825, a conflict resolution manager 830, an uplink control channel transmission manager 835, or any combination thereof. The communications manager 820 may be an example of aspects of a communications manager 720 as described herein. In some examples, the communications manager 820, or various components thereof, may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communications at a UE in accordance with examples as disclosed herein. The uplink control channel scheduling manager 825 may be configured as or otherwise support a means for receiving, from a network entity, one or more control messages that collectively schedule three or more uplink control channels involving two or more scheduling overlaps between the three or more uplink control channels, at least one of the three or more uplink control channels scheduled with repetition across multiple TTIs. The conflict resolution manager 830 may be configured as or otherwise support a means for performing a conflict resolution procedure to resolve the two or more scheduling overlaps, the conflict resolution procedure based at least in part on an order for resolving scheduling overlaps between the three or more uplink control channels. The uplink control channel transmission manager 835 may be configured as or otherwise support a means for transmitting a resolved set of uplink control channels from the three or more uplink control channels based at least in part on the conflict resolution procedure.

Figure 9:
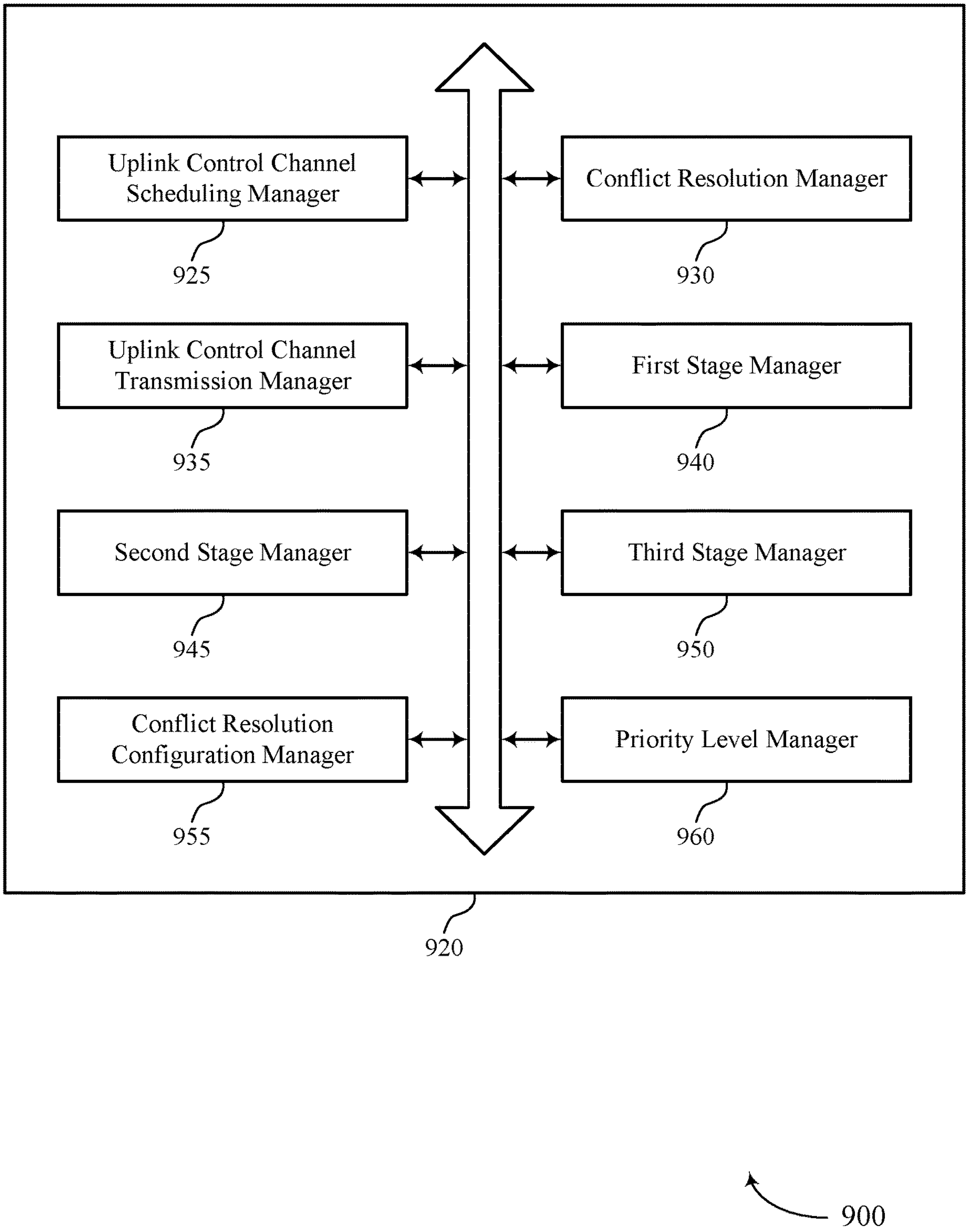
FIG. 9 shows a block diagram of a communications manager that supports collision handling between PUCCH repetitions in accordance with one or more aspects of the present disclosure.

FIG. 9 shows a block diagram 900 of a communications manager 920 that supports collision handling between PUCCH repetitions in accordance with one or more aspects of the present disclosure. The communications manager 920 may be an example of aspects of a communications manager 720, a communications manager 820, or both, as described herein. The communications manager 920, or various components thereof, may be an example of means for performing various aspects of collision handling between PUCCH repetitions as described herein. For example, the communications manager 920 may include an uplink control channel scheduling manager 925, a conflict resolution manager 930, an uplink control channel transmission manager 935, a first stage manager 940, a second stage manager 945, a third stage manager 950, a conflict resolution configuration manager 955, a priority level manager 960, or any combination thereof. Each of these components may communicate, directly or indirectly, with one another (e.g., via one or more buses).

The communications manager 920 may support wireless communications at a UE in accordance with examples as disclosed herein. The uplink control channel scheduling manager 925 may be configured as or otherwise support a means for receiving, from a network entity, one or more control messages that collectively schedule three or more uplink control channels involving two or more scheduling overlaps between the three or more uplink control channels, at least one of the three or more uplink control channels scheduled with repetition across multiple TTIs. The conflict resolution manager 930 may be configured as or otherwise support a means for performing a conflict resolution procedure to resolve the two or more scheduling overlaps, the conflict resolution procedure based at least in part on an order for resolving scheduling overlaps between the three or more uplink control channels. The uplink control channel transmission manager 935 may be configured as or otherwise support a means for transmitting a resolved set of uplink control channels from the three or more uplink control channels based at least in part on the conflict resolution procedure.

In some examples, the uplink control channel scheduling manager 925 may be configured as or otherwise support a means for determining, from the three or more uplink control channels, a first set of uplink control channels with repetition across multiple TTIs and a second set of uplink control channels, each of the second set of uplink control channels scheduled for transmission within a respective single TTI.

In some examples, to support performing the conflict resolution procedure, the first stage manager 940 may be configured as or otherwise support a means for resolving, at a first stage, first scheduling overlaps between uplink control channels of the first set of uplink control channels to generate a subset of the first set of uplink control channels. In some examples, to support performing the conflict resolution procedure, the second stage manager 945 may be configured as or otherwise support a means for resolving, at a second stage, second scheduling overlaps between uplink control channels of the subset of the first set of uplink control channels and uplink control channels of the second set of uplink control channels to generate a third set of uplink control channels. In some examples, to support performing the conflict resolution procedure, the third stage manager 950 may be configured as or otherwise support a means for resolving, at a third stage, third scheduling overlaps between uplink control channels associated with single TTIs of the third set of uplink control channels to generate the resolved set of uplink control channels.

In some examples, to support resolving the first scheduling overlaps between uplink control channels of the first set of uplink control channels, the first stage manager 940 may be configured as or otherwise support a means for: generating an ordering of the first set of uplink control channels, where the order includes the ordering; and resolving the first scheduling overlaps between uplink control channels of the first set of uplink control channels based on the ordering and the priority level associated with each uplink control channel of the first set of uplink control channels.

In some examples, to support resolving the first scheduling overlaps between uplink control channels of the first set of uplink control channels based on the priority level associated with each uplink control channel of the first set of uplink control channels, the first stage manager 940 may be configured as or otherwise support a means for canceling, for each first scheduling overlap, an uplink control channel of the first set of uplink control channels associated with a lower priority level.

In some examples, to support resolving the second scheduling overlaps between uplink control channels of the subset of the first set of uplink control channels and uplink control channels of the second set of uplink control channels, the second stage manager 945 may be configured as or otherwise support a means for: generating a second ordering of the subset of the first set of uplink control channels and a third ordering of the second set of uplink control channels, where the order includes the second ordering and the third ordering; and resolving the second scheduling overlaps between uplink control channels of the subset of the first set of uplink control channels and uplink control channels of the second set of uplink control channels based on the second ordering, the third ordering, and a priority level associated with each uplink control channel of the subset of the first set of uplink control channels and each uplink control channel of the second set of uplink control channels.

In some examples, to support resolving the second scheduling overlaps between uplink control channels of the subset of the first set of uplink control channels and uplink control channels of the second set of uplink control channels based on the priority level associated with each uplink control channel of the subset of the first set of uplink control channels and each uplink control channel of the second set of uplink control channels, the second stage manager 945 may be configured as or otherwise support a means for canceling, for each second scheduling overlap, an uplink control channel of the subset of the first set of uplink control channels or an uplink control channel of the second set of uplink control channels associated with a lower priority level.

In some examples, the priority level manager 960 may be configured as or otherwise support a means for receiving, from the network entity, control signaling indicating the priority level associated with each uplink control channel of the first set of uplink control channels and each uplink control channel of the second set of uplink control channels.

In some examples, the priority level associated with each uplink control channel of the first set of uplink control channels and each uplink control channel of the second set of uplink control channels is based on a type of transmission associated with each uplink control channel of the first set of uplink control channels and each uplink control channel of the second set of uplink control channels.

In some examples, channel state information transmissions are associated with a first priority level, scheduling request transmissions are associated with a second priority level higher than the first priority level, and hybrid automatic repeat request messages are associated with a third priority level higher than the second priority level.

In some examples, the conflict resolution configuration manager 955 may be configured as or otherwise support a means for receiving, from the network entity, control signaling configuring the conflict resolution procedure.

In some examples, to support performing the conflict resolution procedure, the first stage manager 940 may be configured as or otherwise support a means for resolving, at a first stage, first scheduling overlaps between uplink control channels of the first set of uplink control channels and second scheduling overlaps between uplink control channels of the first set of uplink control channels and the second set of uplink control channels to generate a third set of uplink control channels. In some examples, to support performing the conflict resolution procedure, the second stage manager 945 may be configured as or otherwise support a means for resolving, at a second stage, third scheduling overlaps between uplink control channels associated with single transmission time intervals of the third set of uplink control channels to generate the resolved set of uplink control channels.

In some examples, to support resolving the first scheduling overlaps and the second scheduling overlaps, the first stage manager 940 may be configured as or otherwise support a means for: generating an ordering of the first set of uplink control channels and the second set of uplink control channels, wherein the order comprises the ordering; and resolving the first scheduling overlaps and the second scheduling overlaps based on the ordering and a priority level associated with each uplink control channel of the first set of uplink control channels and the second set of uplink control channels.

In some examples, to support resolving the first scheduling overlaps and the second scheduling overlaps based on the priority level associated with each uplink control channel of the first set of uplink control channels and the second set of uplink control channels, the first stage manager 940 may be configured as or otherwise support a means for canceling, for each first scheduling overlap and for each second scheduling overlap, an uplink control channel associated with a lower priority level.

In some examples, the third set of uplink control channels includes no scheduling overlaps involving an uplink control channel scheduled with repetition across multiple transmission time intervals.

In some examples, to support resolving the third scheduling overlaps between uplink control channels associated with single TTIs of the third set of uplink control channels, the third stage manager 950 may be configured as or otherwise support a means for multiplexing, for each third scheduling overlap, the respective associated uplink control channels.

In some examples, to support performing the conflict resolution procedure, the conflict resolution manager 930 may be configured as or otherwise support a means for identifying one or more groups of overlapping uplink control channels of the three or more uplink control channels, and selecting a respective uplink control channel from each group of overlapping uplink control channels based on a priority level associated with each uplink control channel of the three or more uplink control channels to generate the resolved set of uplink control channels from the three or more uplink control channels.

In some examples, the priority level is based on a type of transmission associated with each uplink control channel and a scheduled starting time of each uplink control channel.

In some examples, a first uplink control channel having a higher uplink control information type priority has a higher priority level than a second uplink control channel having a lower uplink control information type priority, and a third uplink control channel having a same higher uplink control information type priority as the first uplink control channel has a higher priority level based on the third uplink control channel having an earlier starting slot than the first uplink control channel.

In some examples, to support identifying one or more groups of overlapping uplink control channels of the three or more uplink control channels, the conflict resolution manager 930 may be configured as or otherwise support a means for identifying a temporally first uplink control channel of the three or more uplink control channels and uplink control channels of the three or more uplink control channels that overlap with the temporally first uplink control channel.

In some examples, to support identifying the temporally first uplink control channel, the conflict resolution manager 930 may be configured as or otherwise support a means for identifying a first uplink control channel within a set of uplink control channels with repetition across multiple transmission time intervals as the temporally first uplink control channel, wherein the first uplink control channel is selected within the set of uplink control channels according to the order.

In some examples, the order includes, from a first set of uplink control channels with different starting symbols, assignment of a smallest index to an uplink control channel of the first set of uplink control channels with an earliest starting symbol, and the order includes, between a second set of uplink control channels with a same starting symbol, assignment of the smallest index to an uplink control channel of the second set of uplink control channels with a longest duration.

In some examples, to support performing the conflict resolution procedure, the conflict resolution manager 930 may be configured as or otherwise support a means for resolving a scheduling overlap involving the temporally first uplink control channel, and identifying a second temporally first uplink control channel within a remaining one or more groups of overlapping uplink control channels and uplink control channels of the three or more uplink control channels that overlap with the second temporally first uplink control channel.

In some examples, the conflict resolution manager 930 may be configured as or otherwise support a means for canceling, for each group of overlapping uplink control channels, a remainder of the uplink control channels.

In some examples, to support performing the conflict resolution procedure, the conflict resolution manager 930 may be configured as or otherwise support a means for identifying a first scheduling overlap of the two or more scheduling overlaps involves two uplink control channels scheduled for transmission within a respective single transmission time interval, and multiplexing the two uplink control channels scheduled for transmission within a respective single transmission time interval.

In some examples, to support performing the conflict resolution procedure, the conflict resolution manager 930 may be configured as or otherwise support a means for generating an ordering of the three or more uplink control channels, where the order includes the ordering, and resolving the two or more scheduling overlaps based on the ordering and a priority level associated with each of the three or more uplink control channels.

In some examples, the conflict resolution manager 930 may be configured as or otherwise support a means for resolving scheduling overlaps based on the order until no scheduling overlaps involving an uplink control channel scheduled with repetition across multiple TTIs remain.

In some examples, the conflict resolution manager 930 may be configured as or otherwise support a means for determining the order based on determining a scheduled timing of the three or more uplink control channels and respective durations of the three or more uplink control channels.

Figure 10:
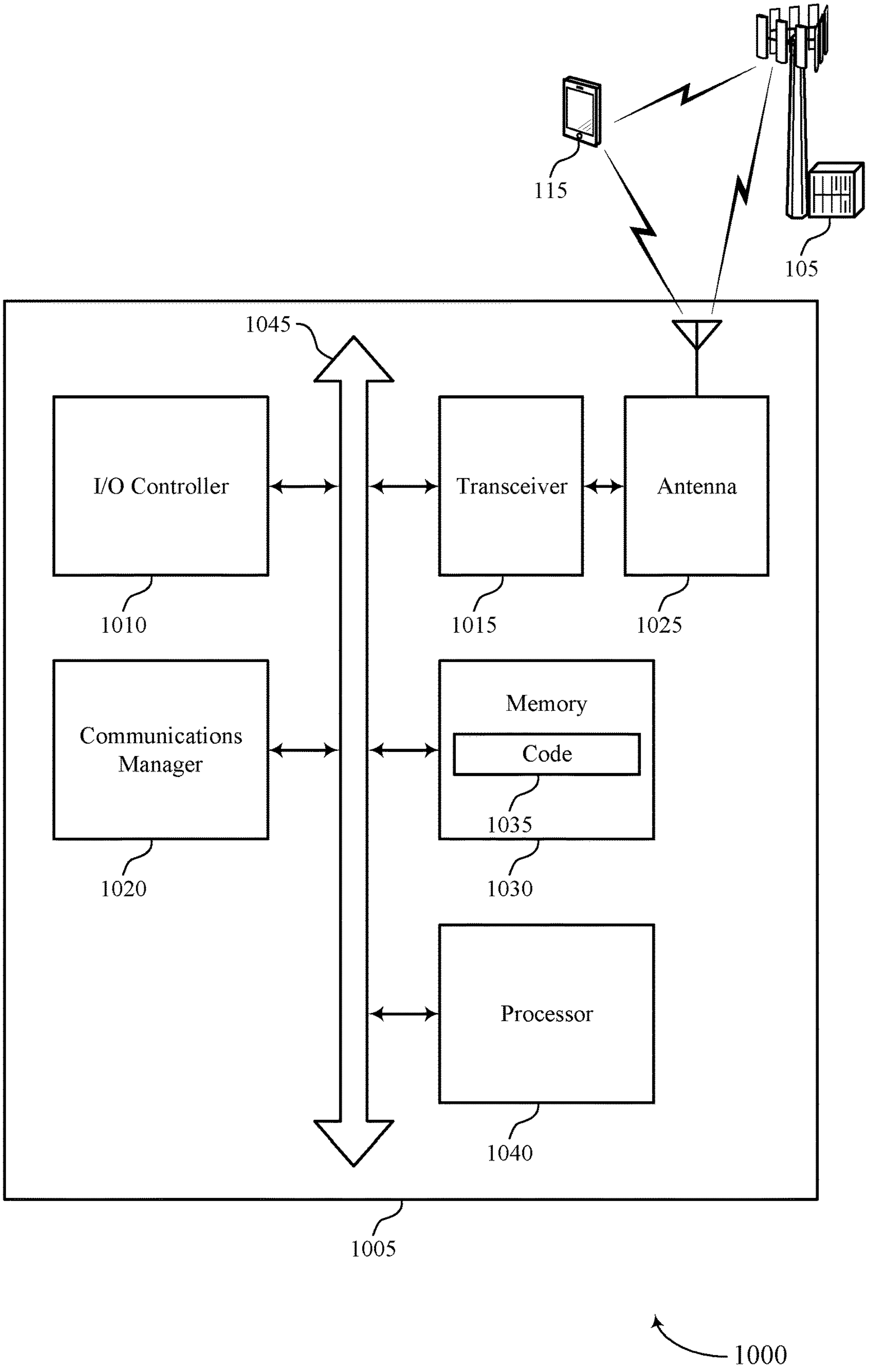
FIG. 10 shows a diagram of a system including a device that supports collision handling between PUCCH repetitions in accordance with one or more aspects of the present disclosure.

FIG. 10 shows a diagram of a system 1000 including a device 1005 that supports collision handling between PUCCH repetitions in accordance with one or more aspects of the present disclosure. The device 1005 may be an example of or include the components of a device 705, a device 805, or a UE 115 as described herein. The device 1005 may communicate (e.g., wirelessly) with one or more network entities 105, one or more UEs 115, or any combination thereof. The device 1005 may include components for bi-directional voice and data communications including components for transmitting and receiving communications, such as a communications manager 1020, an input/output (I/O) controller 1010, a transceiver 1015, an antenna 1025, a memory 1030, code 1035, and a processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally, or alternatively, the I/O controller 1010 may represent or interact with a modem, a keyboard, a mouse, a touchscreen, or a similar device. In some cases, the I/O controller 1010 may be implemented as part of a processor, such as the processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include random access memory (RAM) and read-only memory (ROM). The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a basic I/O system (BIOS) which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting collision handling between PUCCH repetitions). For example, the device 1005 or a component of the device 1005 may include a processor 1040 and memory 1030 coupled with or to the processor 1040, the processor 1040 and memory 1030 configured to perform various functions described herein.

The communications manager 1020 may support wireless communications at a UE in accordance with examples as disclosed herein. For example, the communications manager 1020 may be configured as or otherwise support a means for receiving, from a network entity, one or more control messages that collectively schedule three or more uplink control channels involving two or more scheduling overlaps between the three or more uplink control channels, at least one of the three or more uplink control channels scheduled with repetition across multiple TTIs. The communications manager 1020 may be configured as or otherwise support a means for performing a conflict resolution procedure to resolve the two or more scheduling overlaps, the conflict resolution procedure based at least in part on an order for resolving scheduling overlaps between the three or more uplink control channels. The communications manager 1020 may be configured as or otherwise support a means for transmitting a resolved set of uplink control channels from the three or more uplink control channels based at least in part on the conflict resolution procedure.

By including or configuring the communications manager 1020 in accordance with examples as described herein, the device 1005 may support techniques for managing overlapping PUCCHs involving repetitions, which may support improved communication reliability, reduced latency, more efficient utilization of communication resources, and improved coordination between devices.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of collision handling between PUCCH repetitions as described herein, or the processor 1040 and the memory 1030 may be otherwise configured to perform or support such operations.

Figure 11:
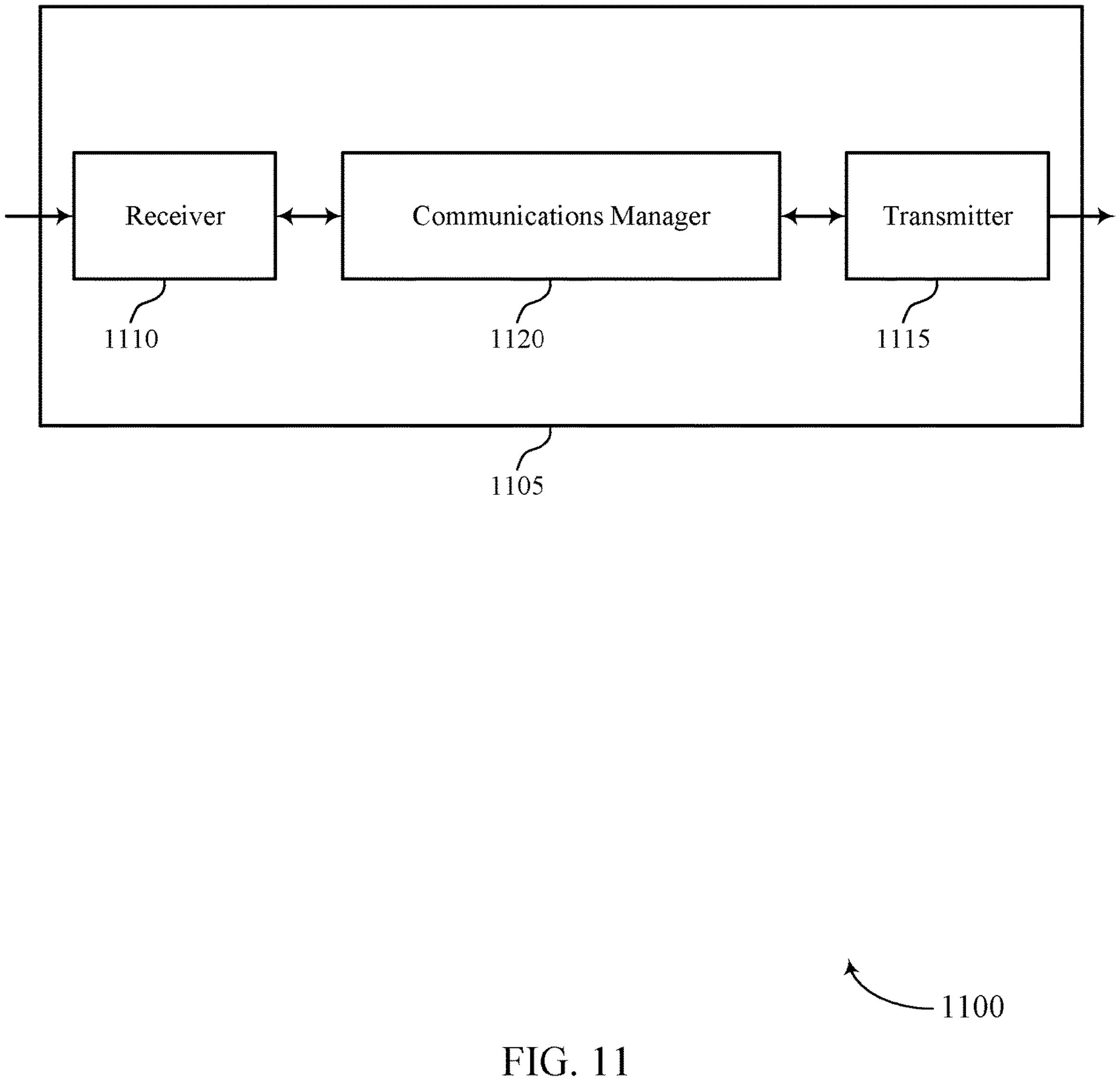
FIGS. 11 and 12 show block diagrams of devices that support collision handling between PUCCH repetitions in accordance with one or more aspects of the present disclosure.

FIG. 11 shows a block diagram 1100 of a device 1105 that supports collision handling between PUCCH repetitions in accordance with one or more aspects of the present disclosure. The device 1105 may be an example of aspects of a network entity 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1105. In some examples, the receiver 1110 may support obtaining information by receiving signals via one or more antennas. Additionally, or alternatively, the receiver 1110 may support obtaining information by receiving signals via one or more wired (e.g., electrical, fiber optic) interfaces, wireless interfaces, or any combination thereof.

The transmitter 1115 may provide a means for outputting (e.g., transmitting, providing, conveying, sending) information generated by other components of the device 1105. For example, the transmitter 1115 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1115 may support outputting information by transmitting signals via one or more antennas. Additionally, or alternatively, the transmitter 1115 may support outputting information by transmitting signals via one or more wired (e.g., electrical, fiber optic) interfaces, wireless interfaces, or any combination thereof. In some examples, the transmitter 1115 and the receiver 1110 may be co-located in a transceiver, which may include or be coupled with a modem.

The communications manager 1120, the receiver 1110, the transmitter 1115, or various combinations thereof or various components thereof may be examples of means for performing various aspects of collision handling between PUCCH repetitions as described herein. For example, the communications manager 1120, the receiver 1110, the transmitter 1115, or various combinations or components thereof may support a method for performing one or more of the functions described herein.

In some examples, the communications manager 1120, the receiver 1110, the transmitter 1115, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1120, the receiver 1110, the transmitter 1115, or various combinations or components thereof may be implemented in code (e.g., as communications management software or firmware) executed by a processor. If implemented in code executed by a processor, the functions of the communications manager 1120, the receiver 1110, the transmitter 1115, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1120 may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communications at a network entity in accordance with examples as disclosed herein. For example, the communications manager 1120 may be configured as or otherwise support a means for transmitting one or more control messages that collectively schedule three or more uplink control channels involving two or more scheduling overlaps between the three or more uplink control channels, at least one of the three or more uplink control channels scheduled with repetition across TTIs. The communications manager 1120 may be configured as or otherwise support a means for performing a conflict resolution procedure to resolve the two or more scheduling overlaps, the conflict resolution procedure based at least in part on an order for resolving scheduling overlaps between the three or more uplink control channels. The communications manager 1120 may be configured as or otherwise support a means for receiving a resolved set of uplink control channels from the three or more uplink control channels based at least in part on the conflict resolution procedure.

By including or configuring the communications manager 1120 in accordance with examples as described herein, the device 1105 (e.g., a processor controlling or otherwise coupled with the receiver 1110, the transmitter 1115, the communications manager 1120, or a combination thereof) may support techniques for managing overlapping PUCCHs involving repetitions, which may support more efficient utilization of communication resources.

Figure 12:
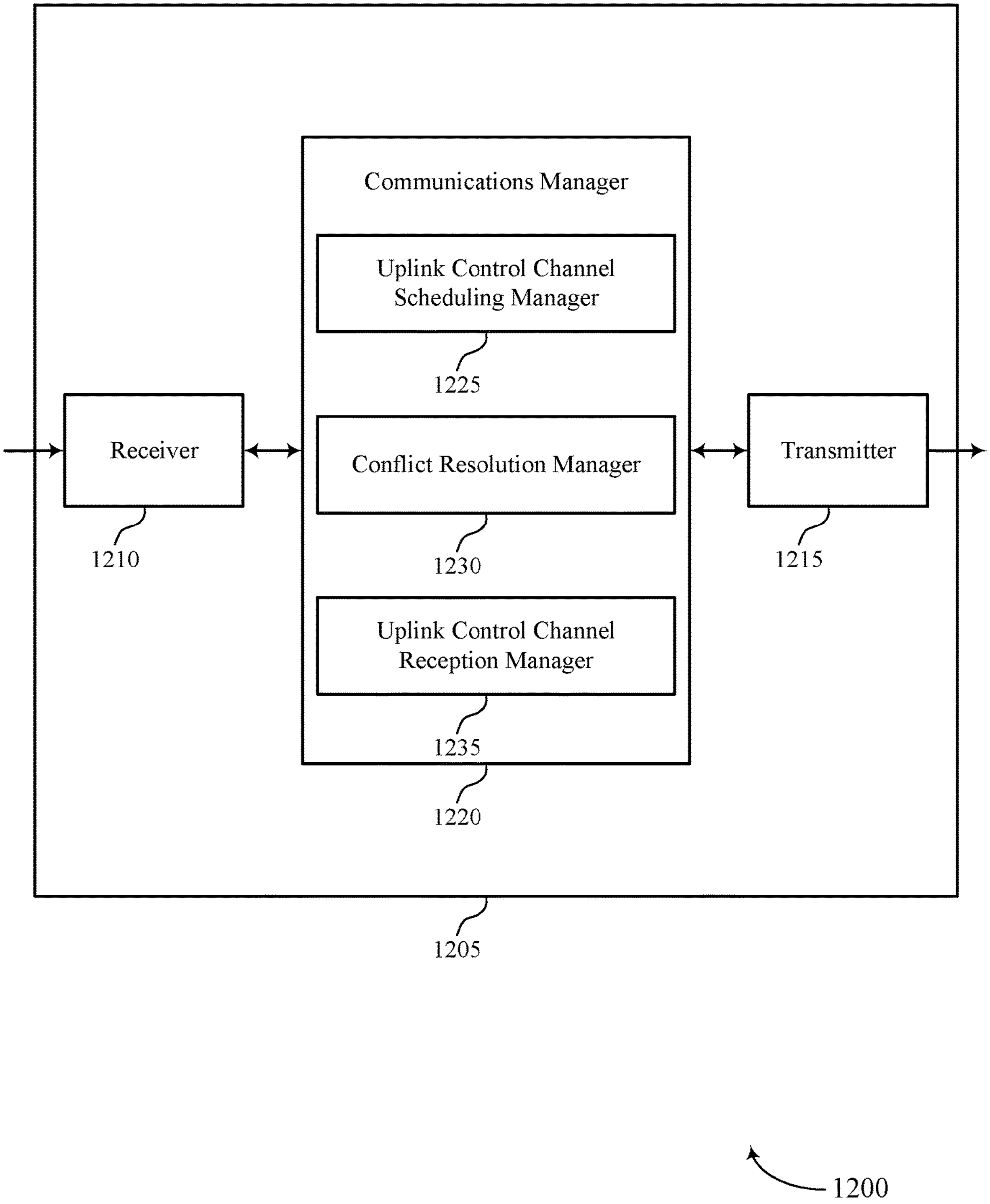

FIG. 12 shows a block diagram 1200 of a device 1205 that supports collision handling between PUCCH repetitions in accordance with one or more aspects of the present disclosure. The device 1205 may be an example of aspects of a device 1105 or a network entity 105 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1205. In some examples, the receiver 1210 may support obtaining information by receiving signals via one or more antennas. Additionally, or alternatively, the receiver 1210 may support obtaining information by receiving signals via one or more wired (e.g., electrical, fiber optic) interfaces, wireless interfaces, or any combination thereof.

The transmitter 1215 may provide a means for outputting (e.g., transmitting, providing, conveying, sending) information generated by other components of the device 1205. For example, the transmitter 1215 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1215 may support outputting information by transmitting signals via one or more antennas. Additionally, or alternatively, the transmitter 1215 may support outputting information by transmitting signals via one or more wired (e.g., electrical, fiber optic) interfaces, wireless interfaces, or any combination thereof. In some examples, the transmitter 1215 and the receiver 1210 may be co-located in a transceiver, which may include or be coupled with a modem.

The device 1205, or various components thereof, may be an example of means for performing various aspects of collision handling between PUCCH repetitions as described herein. For example, the communications manager 1220 may include an uplink control channel scheduling manager 1225, a conflict resolution manager 1230, an uplink control channel reception manager 1235, or any combination thereof. The communications manager 1220 may be an example of aspects of a communications manager 1120 as described herein. In some examples, the communications manager 1220, or various components thereof, may be configured to perform various operations (e.g., receiving, obtaining, monitoring, outputting, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to obtain information, output information, or perform various other operations as described herein.

The communications manager 1220 may support wireless communications at a network entity in accordance with examples as disclosed herein. The uplink control channel scheduling manager 1225 may be configured as or otherwise support a means for transmitting one or more control messages that collectively schedule three or more uplink control channels involving two or more scheduling overlaps between the three or more uplink control channels, at least one of the three or more uplink control channels scheduled with repetition across TTIs. The conflict resolution manager 1230 may be configured as or otherwise support a means for performing a conflict resolution procedure to resolve the two or more scheduling overlaps, the conflict resolution procedure based at least in part on an order for resolving scheduling overlaps between the three or more uplink control channels. The uplink control channel reception manager 1235 may be configured as or otherwise support a means for receiving a resolved set of uplink control channels from the three or more uplink control channels based at least in part on the conflict resolution procedure.

Figure 13:
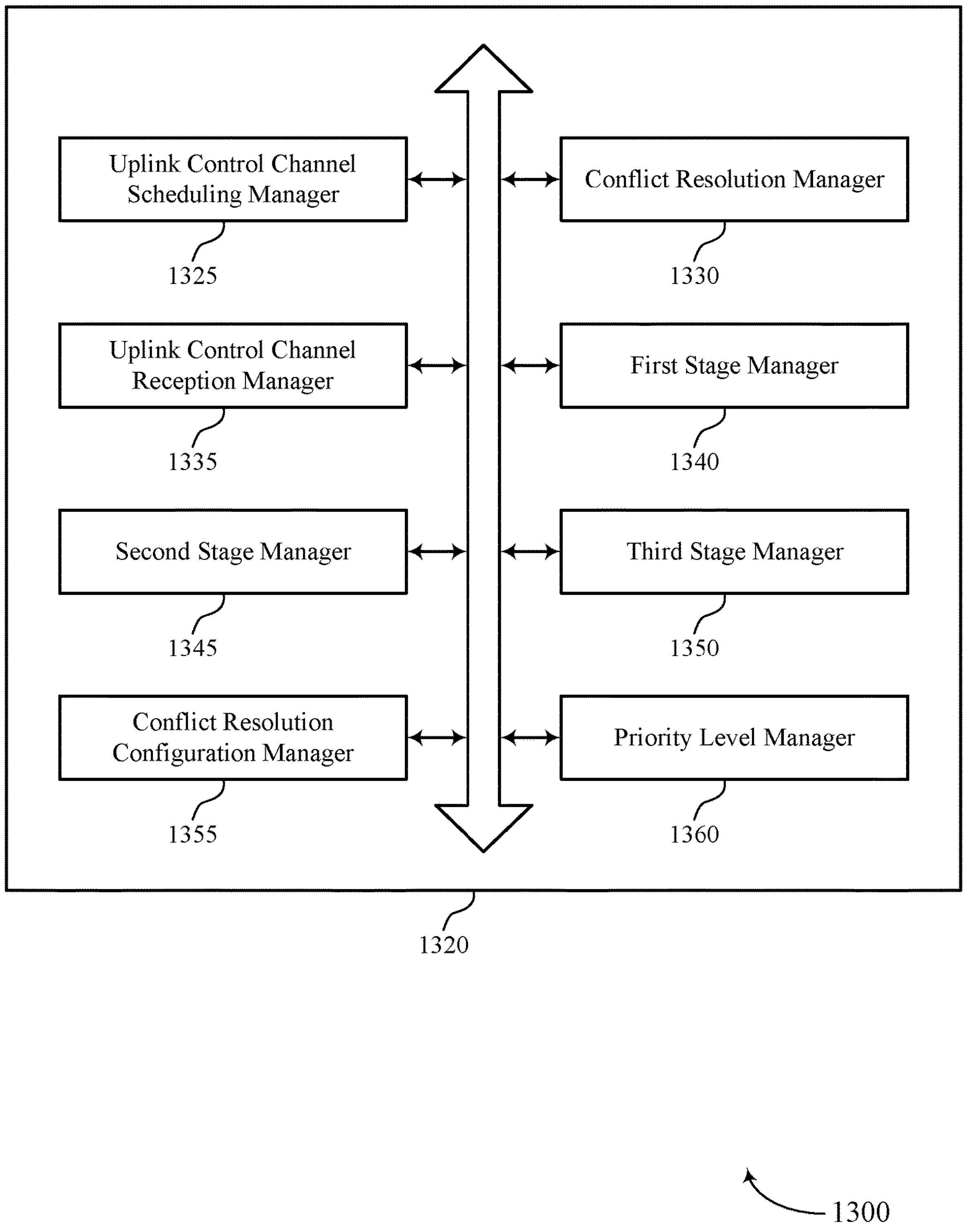
FIG. 13 shows a block diagram of a communications manager that supports collision handling between PUCCH repetitions in accordance with one or more aspects of the present disclosure.

FIG. 13 shows a block diagram 1300 of a communications manager 1320 that supports collision handling between PUCCH repetitions in accordance with one or more aspects of the present disclosure. The communications manager 1320 may be an example of aspects of a communications manager 1120, a communications manager 1220, or both, as described herein. The communications manager 1320, or various components thereof, may be an example of means for performing various aspects of collision handling between PUCCH repetitions as described herein. For example, the communications manager 1320 may include an uplink control channel scheduling manager 1325, a conflict resolution manager 1330, an uplink control channel reception manager 1335, a first stage manager 1340, a second stage manager 1345, a third stage manager 1350, a conflict resolution configuration manager 1355, a priority level manager 1360, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1320 may support wireless communications at a network entity in accordance with examples as disclosed herein. The uplink control channel scheduling manager 1325 may be configured as or otherwise support a means for transmitting one or more control messages that collectively schedule three or more uplink control channels involving two or more scheduling overlaps between the three or more uplink control channels, at least one of the three or more uplink control channels scheduled with repetition across TTIs. The conflict resolution manager 1330 may be configured as or otherwise support a means for performing a conflict resolution procedure to resolve the two or more scheduling overlaps, the conflict resolution procedure based at least in part on an order for resolving scheduling overlaps between the three or more uplink control channels. The uplink control channel reception manager 1335 may be configured as or otherwise support a means for receiving a resolved set of uplink control channels from the three or more uplink control channels based at least in part on the conflict resolution procedure.

In some examples, the uplink control channel scheduling manager 1325 may be configured as or otherwise support a means for determining, from the three or more uplink control channels, a first set of uplink control channels with repetition across multiple TTIs and a second set of uplink control channels, each of the second set of uplink control channels scheduled for transmission within a respective single TTI.

In some examples, to support performing the conflict resolution procedure, the first stage manager 1340 may be configured as or otherwise support a means for resolving, at a first stage, first scheduling overlaps between uplink control channels of the first set of uplink control channels to generate a subset of the first set of uplink control channels. In some examples, to support performing the conflict resolution procedure, the second stage manager 1345 may be configured as or otherwise support a means for resolving, at a second stage, second scheduling overlaps between uplink control channels of the subset of the first set of uplink control channels and uplink control channels of the second set of uplink control channels to generate a third set of uplink control channels. In some examples, to support performing the conflict resolution procedure, the third stage manager 1350 may be configured as or otherwise support a means for resolving, at a third stage, third scheduling overlaps between uplink control channels associated with single TTIs of the third set of uplink control channels to generate the resolved set of uplink control channels.

In some examples, to support resolving the first scheduling overlaps between uplink control channels of the first set of uplink control channels, the first stage manager 1340 may be configured as or otherwise support a means for: generating an ordering of the first set of uplink control channels, where the order includes the ordering; and resolving the first scheduling overlaps between uplink control channels of the first set of uplink control channels based on the ordering and the priority level associated with each uplink control channel of the first set of uplink control channels.

In some examples, to support resolving the first scheduling overlaps between uplink control channels of the first set of uplink control channels based on the priority level associated with each uplink control channel of the first set of uplink control channels, the first stage manager 1340 may be configured as or otherwise support a means for canceling, for each first scheduling overlap, an uplink control channel of the first set of uplink control channels associated with a lower priority level.

In some examples, to support resolving the second scheduling overlaps between uplink control channels of the subset of the first set of uplink control channels and uplink control channels of the second set of uplink control channels, the second stage manager 1345 may be configured as or otherwise support a means for: generating a second ordering of the subset of the first set of uplink control channels and a third ordering of the second set of uplink control channels, where the order includes the second ordering and the third ordering; and resolving the second scheduling overlaps between uplink control channels of the subset of the first set of uplink control channels and uplink control channels of the second set of uplink control channels based on the second ordering, the third ordering, and priority level associated with each uplink control channel of the subset of the first set of uplink control channels and each uplink control channel of the second set of uplink control channels.

In some examples, to support resolving the second scheduling overlaps between uplink control channels of the subset of the first set of uplink control channels and uplink control channels of the second set of uplink control channels based on the priority level associated with each uplink control channel of the subset of the first set of uplink control channels and each uplink control channel of the second set of uplink control channels, the second stage manager 1345 may be configured as or otherwise support a means for canceling, for each second scheduling overlap, an uplink control channel of the subset of the first set of uplink control channels or an uplink control channel of the second set of uplink control channels associated with a lower priority level.

In some examples, the priority level manager 1360 may be configured as or otherwise support a means for transmitting control signaling indicating the priority level associated with each uplink control channel of the first set of uplink control channels and each uplink control channel of the second set of uplink control channels.

In some examples, the priority level associated with each uplink control channel of the first set of uplink control channels and each uplink control channel of the second set of uplink control channels is based on a type of transmission associated with each uplink control channel of the first set of uplink control channels and each uplink control channel of the second set of uplink control channels.

In some examples, channel state information transmissions are associated with a first priority level, scheduling request transmissions are associated with a second priority level higher than the first priority level, and hybrid automatic repeat request messages are associated with a third priority level higher than the second priority level.

In some examples, the conflict resolution configuration manager 1355 may be configured as or otherwise support a means for transmitting control signaling configuring the conflict resolution procedure.

In some examples, to support performing the conflict resolution procedure, the first stage manager 1340 may be configured as or otherwise support a means for resolving, at a first stage, first scheduling overlaps between uplink control channels of the first set of uplink control channels and second scheduling overlaps between uplink control channels of the first set of uplink control channels and the second set of uplink control channels to generate a third set of uplink control channels. In some examples, to support performing the conflict resolution procedure, the second stage manager 1345 may be configured as or otherwise support a means for resolving, at a second stage, third scheduling overlaps between uplink control channels associated with single transmission time intervals of the third set of uplink control channels to generate the resolved set of uplink control channels.

In some examples, to support resolving the first scheduling overlaps and the second scheduling overlaps, the first stage manager 1340 may be configured as or otherwise support a means for: generating an ordering of the first set of uplink control channels and the second set of uplink control channels, wherein the order comprises the ordering; and resolving the first scheduling overlaps and the second scheduling overlaps based on the ordering and a priority level associated with each uplink control channel of the first set of uplink control channels and the second set of uplink control channels.

In some examples, to support resolving the first scheduling overlaps and the second scheduling overlaps based on the priority level associated with each uplink control channel of the first set of uplink control channels and the second set of uplink control channels, the first stage manager 1340 may be configured as or otherwise support a means for canceling, for each first scheduling overlap and for each second scheduling overlap, an uplink control channel associated with a lower priority level.

In some examples, the third set of uplink control channels includes no scheduling overlaps involving an uplink control channel scheduled with repetition across multiple transmission time intervals.

In some examples, to support resolving the third scheduling overlaps between uplink control channels associated with single TTIs of the third set of uplink control channels, the third stage manager 1350 may be configured as or otherwise support a means for multiplexing, for each third scheduling overlap, the respective associated uplink control channels.

In some examples, to support performing the conflict resolution procedure, the conflict resolution manager 1330 may be configured as or otherwise support a means for identifying one or more groups of overlapping uplink control channels of the three or more uplink control channels, and selecting a respective uplink control channel from each group of overlapping uplink control channels based on a priority level associated with each uplink control channel of the three or more uplink control channels to generate the resolved set of uplink control channels from the three or more uplink control channels.

In some examples, the priority level is based on a type of transmission associated with each uplink control channel and a scheduled starting time of each uplink control channel.

In some examples, a first uplink control channel having a higher uplink control information type priority has a higher priority level than a second uplink control channel having a lower uplink control information type priority, and a third uplink control channel having a same higher uplink control information type priority as the first uplink control channel has a higher priority level based on the third uplink control channel having an earlier starting slot than the first uplink control channel.

In some examples, to support identifying one or more groups of overlapping uplink control channels of the three or more uplink control channels, the conflict resolution manager 1330 may be configured as or otherwise support a means for identifying a temporally first uplink control channel of the three or more uplink control channels and uplink control channels of the three or more uplink control channels that overlap with the temporally first uplink control channel.

In some examples, to support identifying the temporally first uplink control channel, the conflict resolution manager 1330 may be configured as or otherwise support a means for identifying a first uplink control channel within a set of uplink control channels with repetition across multiple transmission time intervals as the temporally first uplink control channel, wherein the first uplink control channel is selected within the set of uplink control channels according to the order.

In some examples, the order includes, from a first set of uplink control channels with different starting symbols, assignment of a smallest index to an uplink control channel of the first set of uplink control channels with an earliest starting symbol, and the order includes, between a second set of uplink control channels with a same starting symbol, assignment of the smallest index to an uplink control channel of the second set of uplink control channels with a longest duration.

In some examples, to support performing the conflict resolution procedure, the conflict resolution manager 1330 may be configured as or otherwise support a means for resolving a scheduling overlap involving the temporally first uplink control channel, and identifying a second temporally first uplink control channel within a remaining one or more groups of overlapping uplink control channels and uplink control channels of the three or more uplink control channels that overlap with the second temporally first uplink control channel.

In some examples, the conflict resolution manager 1330 may be configured as or otherwise support a means for canceling, for each group of overlapping uplink control channels, a remainder of the uplink control channels.

In some examples, to support performing the conflict resolution procedure, the conflict resolution manager 1330 may be configured as or otherwise support a means for identifying a first scheduling overlap of the two or more scheduling overlaps involves two uplink control channels scheduled for transmission within a respective single transmission time interval, and multiplexing the two uplink control channels scheduled for transmission within a respective single transmission time interval.

In some examples, to support performing the conflict resolution procedure, the conflict resolution manager 1330 may be configured as or otherwise support a means for generating an ordering of the three or more uplink control channels, where the order includes the ordering, and resolving the two or more scheduling overlaps based on the ordering and a priority level associated with each of the three or more uplink control channels.

In some examples, the conflict resolution manager 1330 may be configured as or otherwise support a means for resolving scheduling overlaps based on the order until no scheduling overlaps involving an uplink control channel scheduled with repetition across multiple TTIs remain.

In some examples, the conflict resolution manager 1330 may be configured as or otherwise support a means for determining the order based on determining a scheduled timing of the three or more uplink control channels and respective durations of the three or more uplink control channels.

Figure 14:
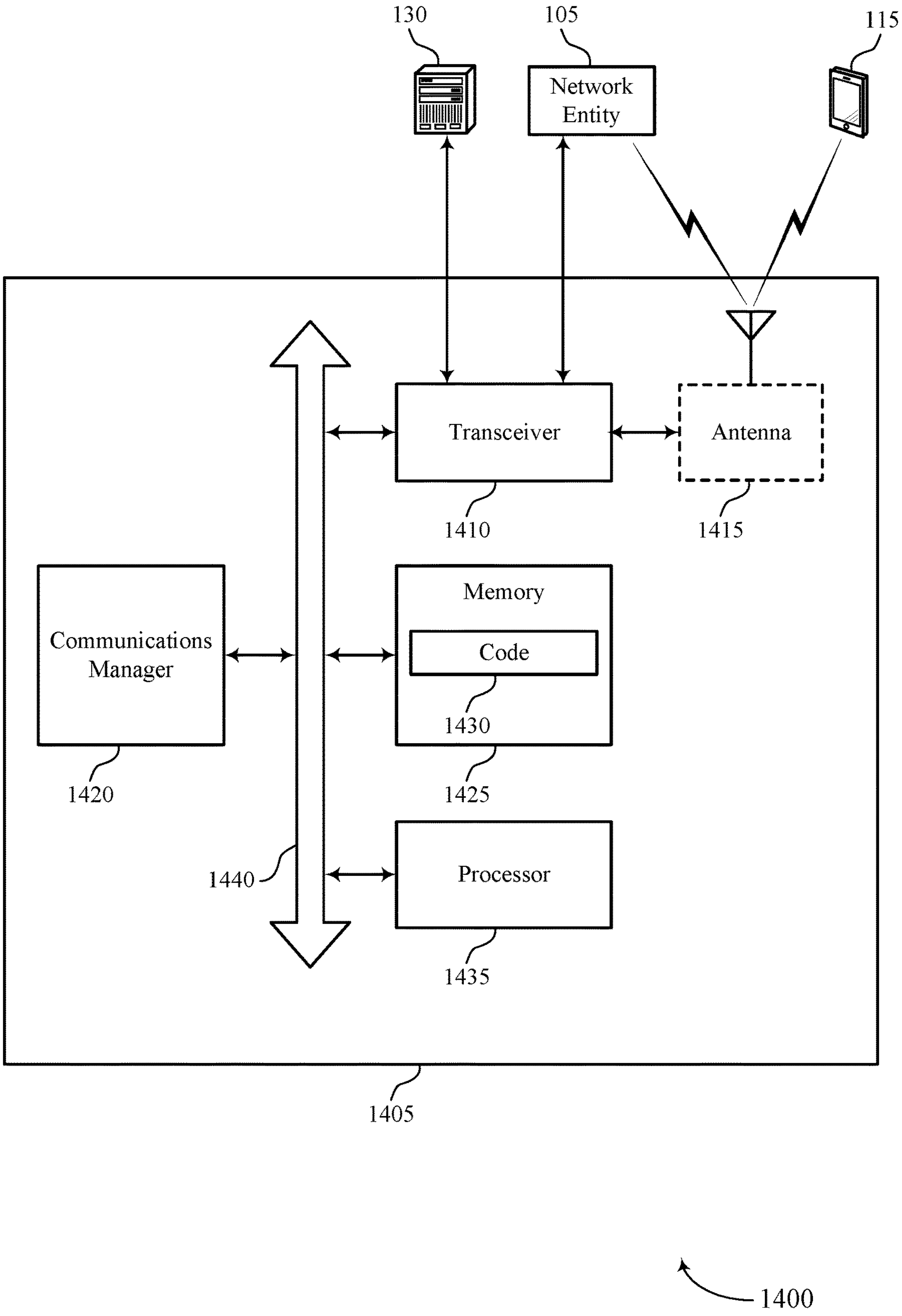
FIG. 14 shows a diagram of a system including a device that supports collision handling between PUCCH repetitions in accordance with one or more aspects of the present disclosure.

FIG. 14 shows a diagram of a system 1400 including a device 1405 that supports collision handling between PUCCH repetitions in accordance with one or more aspects of the present disclosure. The device 1405 may be an example of or include the components of a device 1105, a device 1205, or a network entity 105 as described herein. The device 1405 may communicate with one or more network entities 105, one or more UEs 115, or any combination thereof, which may include communications over one or more wired interfaces, over one or more wireless interfaces, or any combination thereof. The device 1405 may include components that support outputting and obtaining communications, such as a communications manager 1420, a transceiver 1410, an antenna 1415, a memory 1425, code 1430, and a processor 1435. These components may be in electronic communication or otherwise coupled (e.g., operatively, communicatively, functionally, electronically, electrically) via one or more buses (e.g., a bus 1440).

The transceiver 1410 may support bi-directional communications via wired links, wireless links, or both as described herein. In some examples, the transceiver 1410 may include a wired transceiver and may communicate bi-directionally with another wired transceiver. Additionally, or alternatively, in some examples, the transceiver 1410 may include a wireless transceiver and may communicate bi-directionally with another wireless transceiver. In some examples, the device 1405 may include one or more antennas 1415, which may be capable of transmitting or receiving wireless transmissions (e.g., concurrently). The transceiver 1410 may also include a modem to modulate signals, to provide the modulated signals for transmission (e.g., by one or more antennas 1415, by a wired transmitter), to receive modulated signals (e.g., from one or more antennas 1415, from a wired receiver), and to demodulate signals. The transceiver 1410, or the transceiver 1410 and one or more antennas 1415 or wired interfaces, where applicable, may be an example of a transmitter 1115, a transmitter 1215, a receiver 1110, a receiver 1210, or any combination thereof or component thereof, as described herein. In some examples, the transceiver may be operable to support communications via one or more communications links (e.g., a communication link 125, a backhaul communication link 120, a midhaul communication link 162, a fronthaul communication link 168).

The memory 1425 may include RAM and ROM. The memory 1425 may store computer-readable, computer-executable code 1430 including instructions that, when executed by the processor 1435, cause the device 1405 to perform various functions described herein. The code 1430 may be stored in a non-transitory computer-readable medium such as system memory or another type of memory. In some cases, the code 1430 may not be directly executable by the processor 1435 but may cause a computer (e.g., when compiled and executed) to perform functions described herein. In some cases, the memory 1425 may contain, among other things, a BIOS which may control basic hardware or software operation such as the interaction with peripheral components or devices.

The processor 1435 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1435 may be configured to operate a memory array using a memory controller. In some other cases, a memory controller may be integrated into the processor 1435. The processor 1435 may be configured to execute computer-readable instructions stored in a memory (e.g., the memory 1425) to cause the device 1405 to perform various functions (e.g., functions or tasks supporting collision handling between PUCCH repetitions). For example, the device 1405 or a component of the device 1405 may include a processor 1435 and memory 1425 coupled with the processor 1435, the processor 1435 and memory 1425 configured to perform various functions described herein. The processor 1435 may be an example of a cloud-computing platform (e.g., one or more physical nodes and supporting software such as operating systems, virtual machines, or container instances) that may host the functions (e.g., by executing code 1430) to perform the functions of the device 1405.

In some examples, a bus 1440 may support communications of (e.g., within) a protocol layer of a protocol stack. In some examples, a bus 1440 may support communications associated with a logical channel of a protocol stack (e.g., between protocol layers of a protocol stack), which may include communications performed within a component of the device 1405, or between different components of the device 1405 that may be co-located or located in different locations (e.g., where the device 1405 may refer to a system in which one or more of the communications manager 1420, the transceiver 1410, the memory 1425, the code 1430, and the processor 1435 may be located in one of the different components or divided between different components).

In some examples, the communications manager 1420 may manage aspects of communications with a core network 130 (e.g., via one or more wired or wireless backhaul links). For example, the communications manager 1420 may manage the transfer of data communications for client devices, such as one or more UEs 115. In some examples, the communications manager 1420 may manage communications with other network entities 105, and may include a controller or scheduler for controlling communications with UEs 115 in cooperation with other network entities 105. In some examples, the communications manager 1420 may support an X2 interface within an LTE/LTE-A wireless communications network technology to provide communication between network entities 105.

The communications manager 1420 may support wireless communications at a network entity in accordance with examples as disclosed herein. For example, the communications manager 1420 may be configured as or otherwise support a means for transmitting one or more control messages that collectively schedule three or more uplink control channels involving two or more scheduling overlaps between the three or more uplink control channels, at least one of the three or more uplink control channels scheduled with repetition across multiple TTIs. The communications manager 1420 may be configured as or otherwise support a means for performing a conflict resolution procedure to resolve the two or more scheduling overlaps, the conflict resolution procedure based at least in part on an order for resolving scheduling overlaps between the three or more uplink control channels. The communications manager 1420 may be configured as or otherwise support a means for receiving a resolved set of uplink control channels from the three or more uplink control channels based at least in part on the conflict resolution procedure.

By including or configuring the communications manager 1420 in accordance with examples as described herein, the device 1405 may support techniques for managing overlapping PUCCHs involving repetitions, which may support improved communication reliability, reduced latency, more efficient utilization of communication resources, and improved coordination between devices.

In some examples, the communications manager 1420 may be configured to perform various operations (e.g., receiving, obtaining, monitoring, outputting, transmitting) using or otherwise in cooperation with the transceiver 1410, the one or more antennas 1415 (e.g., where applicable), or any combination thereof. Although the communications manager 1420 is illustrated as a separate component, in some examples, one or more functions described with reference to the communications manager 1420 may be supported by or performed by the processor 1435, the memory 1425, the code 1430, the transceiver 1410, or any combination thereof. For example, the code 1430 may include instructions executable by the processor 1435 to cause the device 1405 to perform various aspects of collision handling between PUCCH repetitions as described herein, or the processor 1435 and the memory 1425 may be otherwise configured to perform or support such operations.

Figure 15:
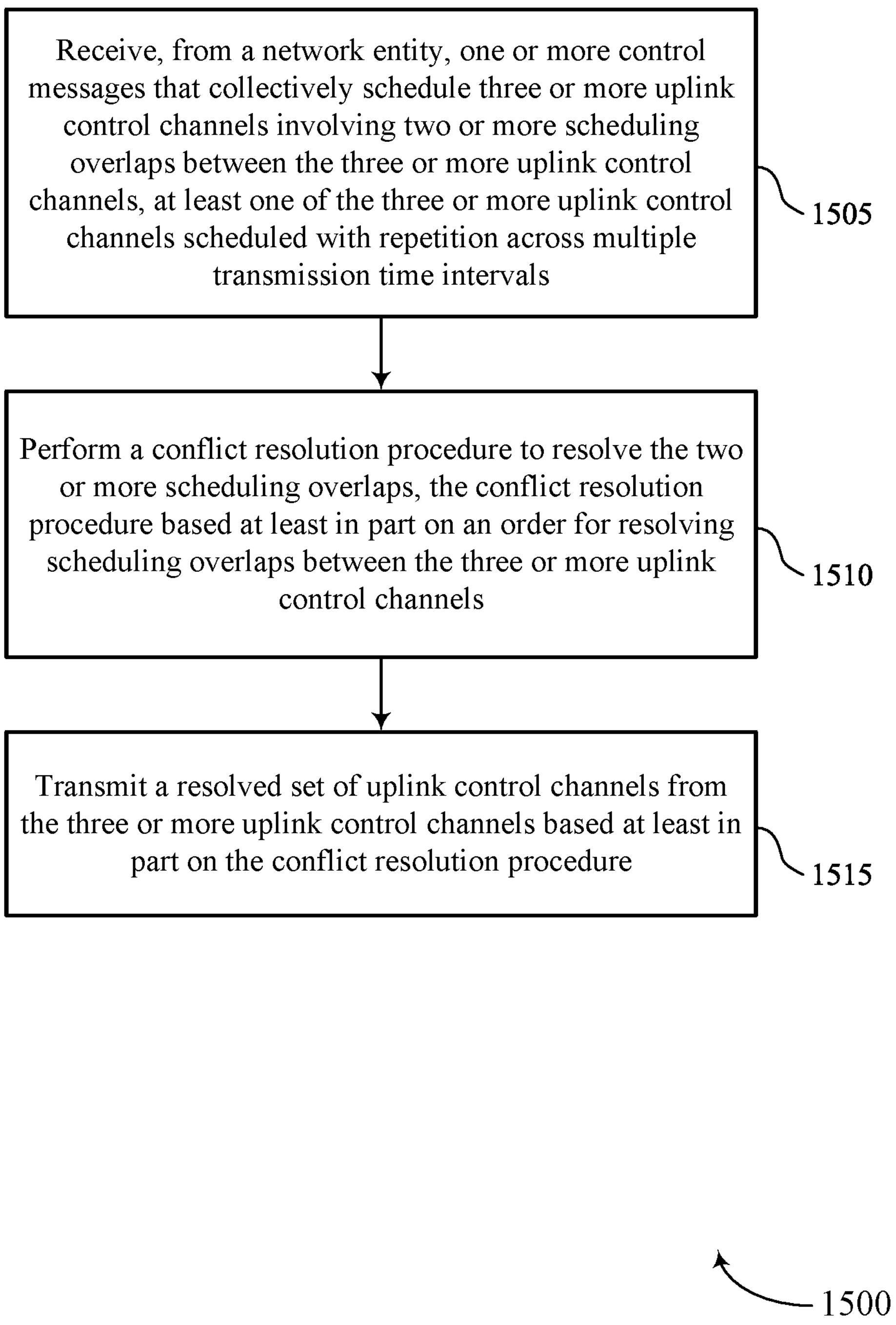
FIGS. 15 through 18 show flowcharts illustrating methods that support collision handling between PUCCH repetitions in accordance with one or more aspects of the present disclosure.

FIG. 15 shows a flowchart illustrating a method 1500 that supports collision handling between PUCCH repetitions in accordance with one or more aspects of the present disclosure. The operations of the method 1500 may be implemented by a UE or its components as described herein. For example, the operations of the method 1500 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1505, the method may include receiving, from a network entity, one or more control messages that collectively schedule three or more uplink control channels involving two or more scheduling overlaps between the three or more uplink control channels, at least one of the three or more uplink control channels scheduled with repetition across multiple TTIs. The operations of 1505 may be performed in accordance with examples as disclosed herein. In some examples, aspects of the operations of 1505 may be performed by an uplink control channel scheduling manager 925 as described with reference to FIG. 9.

At 1510, the method may include performing a conflict resolution procedure to resolve the two or more scheduling overlaps, the conflict resolution procedure based at least in part on an order for resolving scheduling overlaps between the three or more uplink control channels. The operations of 1510 may be performed in accordance with examples as disclosed herein. In some examples, aspects of the operations of 1510 may be performed by a conflict resolution manager 930 as described with reference to FIG. 9.

At 1515, the method may include transmitting a resolved set of uplink control channels from the three or more uplink control channels based at least in part on the conflict resolution procedure. The operations of 1515 may be performed in accordance with examples as disclosed herein. In some examples, aspects of the operations of 1515 may be performed by an uplink control channel transmission manager 935 as described with reference to FIG. 9.

Figure 16:
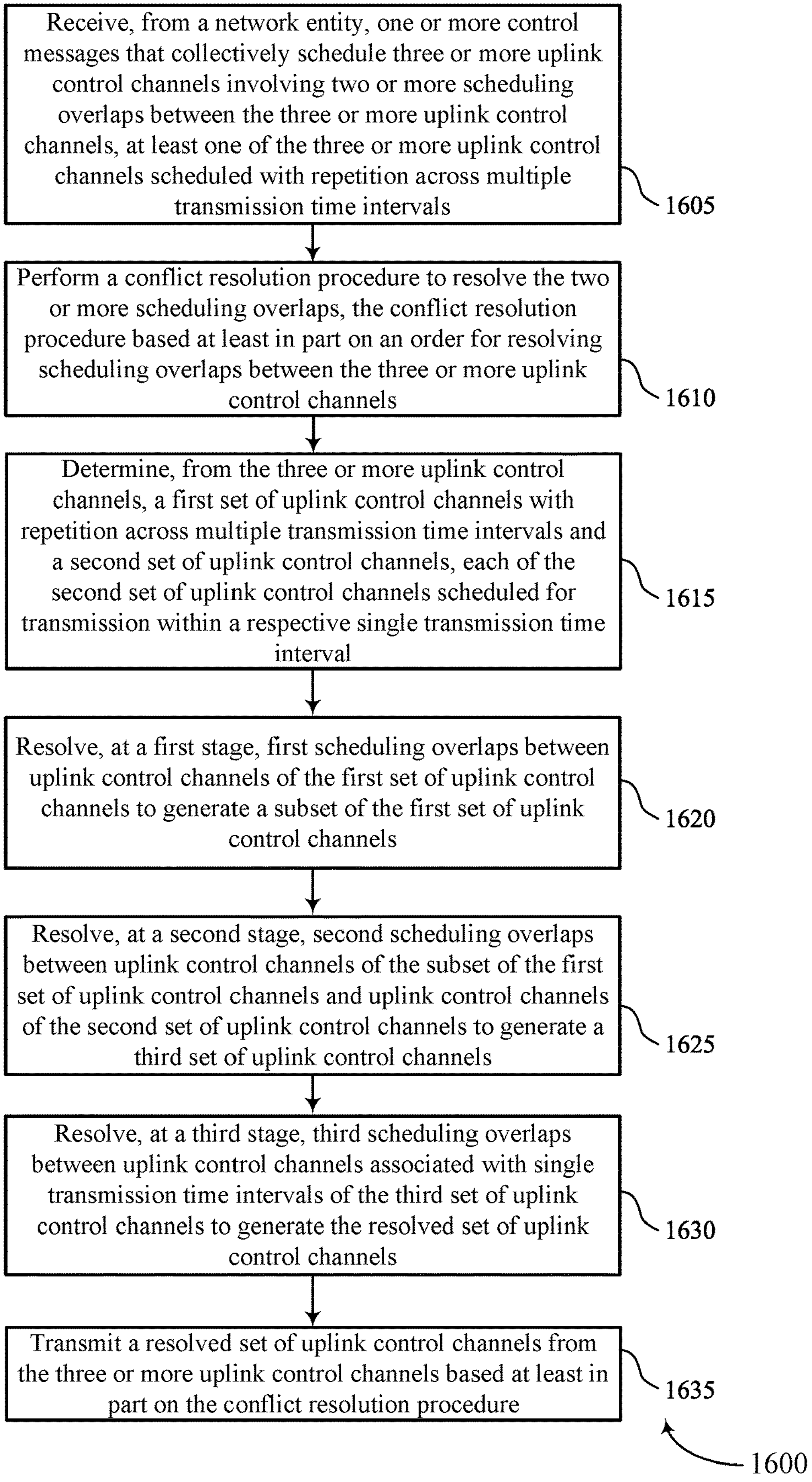

FIG. 16 shows a flowchart illustrating a method 1600 that supports collision handling between PUCCH repetitions in accordance with one or more aspects of the present disclosure. The operations of the method 1600 may be implemented by a UE or its components as described herein. For example, the operations of the method 1600 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1605, the method may include receiving, from a network entity, one or more control messages that collectively schedule three or more uplink control channels involving two or more scheduling overlaps between the three or more uplink control channels, at least one of the three or more uplink control channels scheduled with repetition across multiple TTIs. The operations of 1605 may be performed in accordance with examples as disclosed herein. In some examples, aspects of the operations of 1605 may be performed by an uplink control channel scheduling manager 925 as described with reference to FIG. 9.

At 1610, the method may include performing a conflict resolution procedure to resolve the two or more scheduling overlaps, the conflict resolution procedure based at least in part on an order for resolving scheduling overlaps between the three or more uplink control channels. The operations of 1610 may be performed in accordance with examples as disclosed herein. In some examples, aspects of the operations of 1610 may be performed by a conflict resolution manager 930 as described with reference to FIG. 9.

At 1515, the method may include determining, from the three or more uplink control channels, a first set of uplink control channels with repetition across multiple TTIs and a second set of uplink control channels, each of the second set of uplink control channels scheduled for transmission within a respective single TTI. The operations of 1615 may be performed in accordance with examples as disclosed herein. In some examples, aspects of the operations of 1615 may be performed by an uplink control channel scheduling manager 925 as described with reference to FIG. 9.

At 1620, the method may include resolving, at a first stage, first scheduling overlaps between uplink control channels of the first set of uplink control channels to generate a subset of the first set of uplink control channels. The operations of 1620 may be performed in accordance with examples as disclosed herein. In some examples, aspects of the operations of 1620 may be performed by a first stage manager 940 as described with reference to FIG. 9.

At 1625, the method may include resolving, at a second stage, second scheduling overlaps between uplink control channels of the subset of the first set of uplink control channels and uplink control channels of the second set of uplink control channels to generate a third set of uplink control channels. The operations of 1625 may be performed in accordance with examples as disclosed herein. In some examples, aspects of the operations of 1625 may be performed by a second stage manager 945 as described with reference to FIG. 9.

At 1630, the method may include resolving, at a third stage, third scheduling overlaps between uplink control channels associated with single TTIs of the third set of uplink control channels to generate the resolved set of uplink control channels. The operations of 1630 may be performed in accordance with examples as disclosed herein. In some examples, aspects of the operations of 1630 may be performed by a third stage manager 950 as described with reference to FIG. 9.

At 1635, the method may include transmitting a resolved set of uplink control channels from the three or more uplink control channels based at least in part on the conflict resolution procedure. The operations of 1635 may be performed in accordance with examples as disclosed herein. In some examples, aspects of the operations of 1635 may be performed by an uplink control channel transmission manager 935 as described with reference to FIG. 9.

Figure 17:
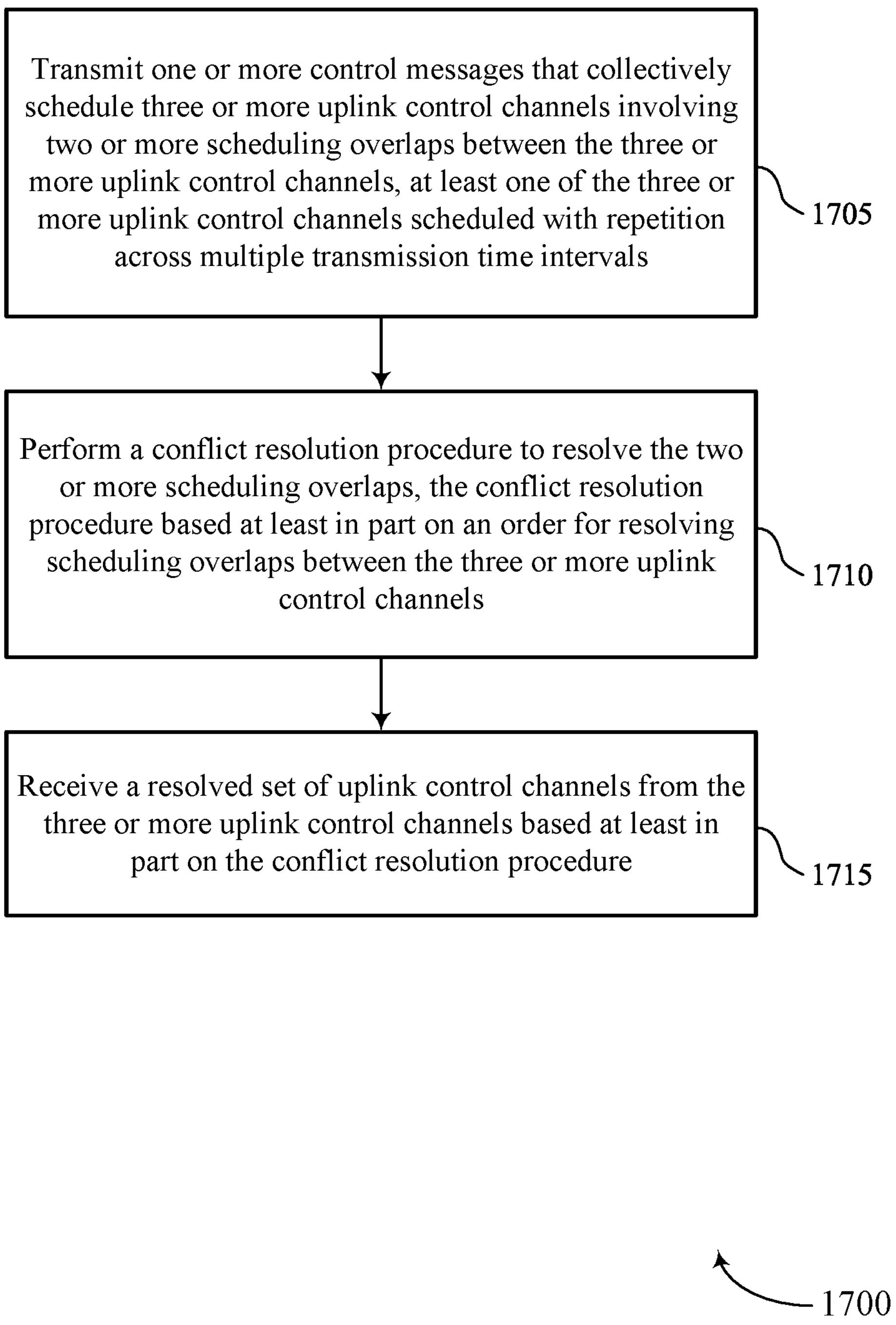

FIG. 17 shows a flowchart illustrating a method 1700 that supports collision handling between PUCCH repetitions in accordance with one or more aspects of the present disclosure. The operations of the method 1700 may be implemented by a network entity or its components as described herein. For example, the operations of the method 1700 may be performed by a network entity as described with reference to FIGS. 1 through 6 and 11 through 14. In some examples, a network entity may execute a set of instructions to control the functional elements of the network entity to perform the described functions. Additionally, or alternatively, the network entity may perform aspects of the described functions using special-purpose hardware.

At 1705, transmitting one or more control messages that collectively schedule three or more uplink control channels involving two or more scheduling overlaps between the three or more uplink control channels, at least one of the three or more uplink control channels scheduled with repetition across TTIs. The operations of 1705 may be performed in accordance with examples as disclosed herein. In some examples, aspects of the operations of 1705 may be performed by an uplink control channel scheduling manager 1325 as described with reference to FIG. 13.

At 1710, the method may include performing a conflict resolution procedure to resolve the two or more scheduling overlaps, the conflict resolution procedure based at least in part on an order for resolving scheduling overlaps between the three or more uplink control channels. The operations of 1710 may be performed in accordance with examples as disclosed herein. In some examples, aspects of the operations of 1710 may be performed by a conflict resolution manager 1330 as described with reference to FIG. 13.

At 1715, receiving a resolved set of uplink control channels from the three or more uplink control channels based at least in part on the conflict resolution procedure. The operations of 1715 may be performed in accordance with examples as disclosed herein. In some examples, aspects of the operations of 1715 may be performed by an uplink control channel reception manager 1335 as described with reference to FIG. 13.

Figure 18:
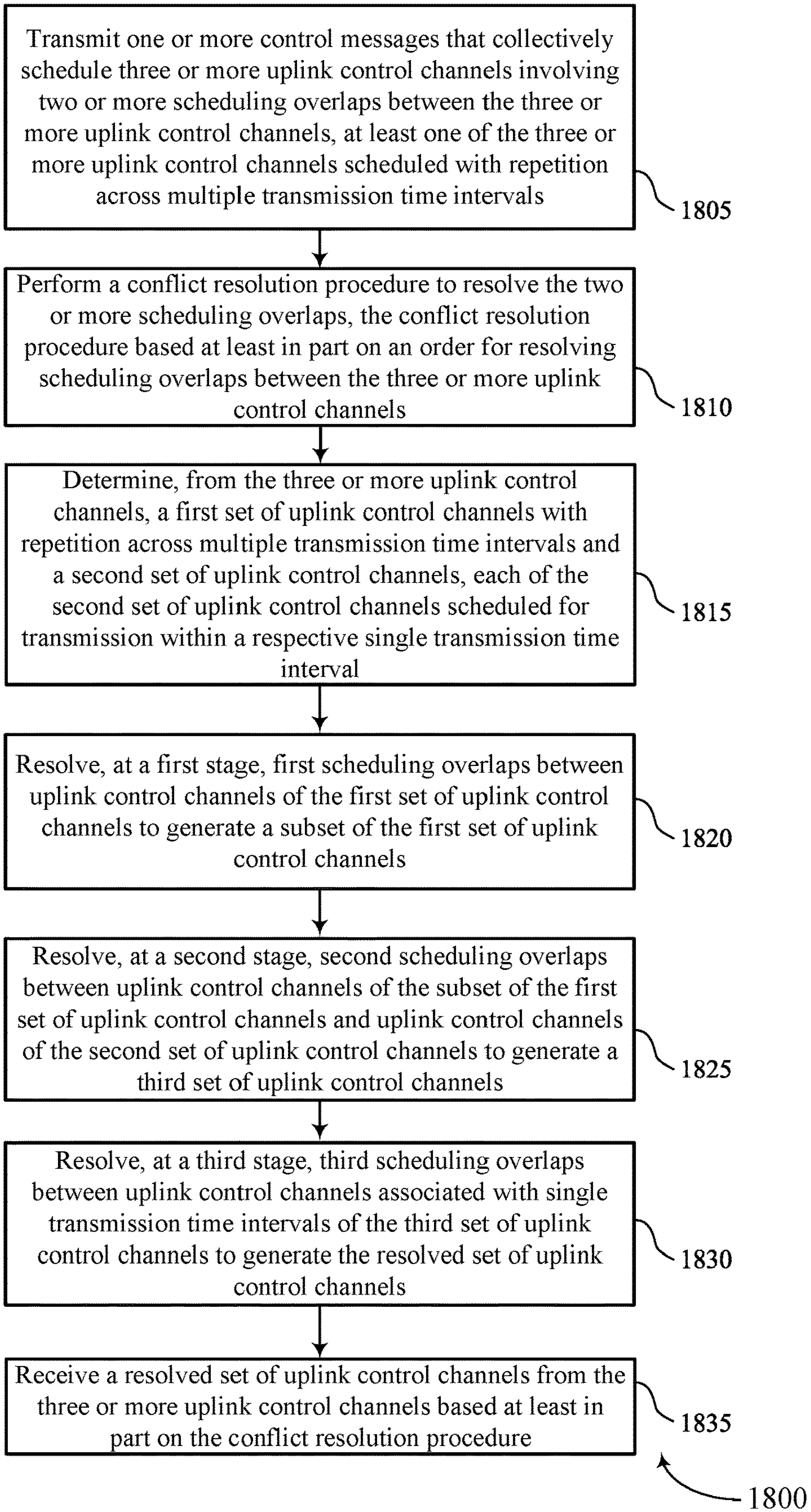

FIG. 18 shows a flowchart illustrating a method 1800 that supports collision handling between PUCCH repetitions in accordance with one or more aspects of the present disclosure. The operations of the method 1800 may be implemented by a network entity or its components as described herein. For example, the operations of the method 1800 may be performed by a network entity as described with reference to FIGS. 1 through 6 and 11 through 14. In some examples, a network entity may execute a set of instructions to control the functional elements of the network entity to perform the described functions. Additionally, or alternatively, the network entity may perform aspects of the described functions using special-purpose hardware.

At 1805, the method may include transmitting one or more control messages that collectively schedule three or more uplink control channels involving two or more scheduling overlaps between the three or more uplink control channels, at least one of the three or more uplink control channels scheduled with repetition across multiple TTIs. The operations of 1805 may be performed in accordance with examples as disclosed herein. In some examples, aspects of the operations of 1805 may be performed by an uplink control channel scheduling manager 1325 as described with reference to FIG. 13.

At 1810, performing a conflict resolution procedure to resolve the two or more scheduling overlaps, the conflict resolution procedure based at least in part on an order for resolving scheduling overlaps between the three or more uplink control channels. The operations of 1810 may be performed in accordance with examples as disclosed herein. In some examples, aspects of the operations of 1810 may be performed by a conflict resolution manager 1330 as described with reference to FIG. 13.

At 1815, the method may include determining, from the three or more uplink control channels, a first set of uplink control channels with repetition across multiple TTIs and a second set of uplink control channels, each of the second set of uplink control channels scheduled for transmission within a respective single TTI. The operations of 1815 may be performed in accordance with examples as disclosed herein. In some examples, aspects of the operations of 1815 may be performed by an uplink control channel scheduling manager 1325 as described with reference to FIG. 13.

At 1820, the method may include resolving, at a first stage, first scheduling overlaps between uplink control channels of the first set of uplink control channels to generate a subset of the first set of uplink control channels. The operations of 1820 may be performed in accordance with examples as disclosed herein. In some examples, aspects of the operations of 1820 may be performed by a first stage manager 1340 as described with reference to FIG. 13.

At 1825, the method may include resolving, at a second stage, second scheduling overlaps between uplink control channels of the subset of the first set of uplink control channels and uplink control channels of the second set of uplink control channels to generate a third set of uplink control channels. The operations of 1825 may be performed in accordance with examples as disclosed herein. In some examples, aspects of the operations of 1825 may be performed by a second stage manager 1345 as described with reference to FIG. 13.

At 1830, the method may include resolving, at a third stage, third scheduling overlaps between uplink control channels associated with single TTIs of the third set of uplink control channels to generate the resolved set of uplink control channels. The operations of 1830 may be performed in accordance with examples as disclosed herein. In some examples, aspects of the operations of 1830 may be performed by a third stage manager 1350 as described with reference to FIG. 13.

At 1835, the method may include receiving a resolved set of uplink control channels from the three or more uplink control channels based at least in part on the conflict resolution procedure. The operations of 1835 may be performed in accordance with examples as disclosed herein. In some examples, aspects of the operations of 1835 may be performed by an uplink control channel reception manager 1335 as described with reference to FIG. 13.

The following provides an overview of aspects of the present disclosure:

Aspect 1: A method for wireless communications at a UE, comprising: receiving, from a network entity, one or more control messages that collectively schedule three or more uplink control channels involving two or more scheduling overlaps between the three or more uplink control channels, at least one of the three or more uplink control channels scheduled with repetition across multiple transmission time intervals; performing a conflict resolution procedure to resolve the two or more scheduling overlaps, the conflict resolution procedure based at least in part on an order for resolving scheduling overlaps between the three or more uplink control channels; and transmitting a resolved set of uplink control channels from the three or more uplink control channels based at least in part on the conflict resolution procedure.

Aspect 2: The method of aspect 1, further comprising: determining, from the three or more uplink control channels, a first set of uplink control channels with repetition across multiple transmission time intervals and a second set of uplink control channels, each of the second set of uplink control channels scheduled for transmission within a respective single transmission time interval.

Aspect 3: The method of aspect 2, wherein performing the conflict resolution procedure comprises: resolving, at a first stage, first scheduling overlaps between uplink control channels of the first set of uplink control channels and second scheduling overlaps between uplink control channels of the first set of uplink control channels and the second set of uplink control channels to generate a third set of uplink control channels; resolving, at a second stage, third scheduling overlaps between uplink control channels associated with single transmission time intervals of the third set of uplink control channels to generate the resolved set of uplink control channels.

Aspect 4: The method of aspect 3, wherein resolving the first scheduling overlaps and the second scheduling overlaps comprises: generating an ordering of the first set of uplink control channels and the second set of uplink control channels, wherein the order comprises the ordering; and resolving the first scheduling overlaps and the second scheduling overlaps based at least in part on the ordering and a priority level associated with each uplink control channel of the first set of uplink control channels and the second set of uplink control channels.

Aspect 5: The method of aspect 4, wherein resolving the first scheduling overlaps and the second scheduling overlaps based at least in part on the priority level associated with each uplink control channel of the first set of uplink control channels and the second set of uplink control channels comprises: canceling, for each first scheduling overlap and for each second scheduling overlap, an uplink control channel associated with a lower priority level.

Aspect 6: The method of any of aspects 3 through 5, wherein the third set of uplink control channels includes no scheduling overlaps involving an uplink control channel scheduled with repetition across multiple transmission time intervals.

Aspect 7: The method of any of aspects 3 through 6, wherein resolving the third scheduling overlaps between uplink control channels associated with single transmission time intervals of the third set of uplink control channels comprises: multiplexing, for each third scheduling overlap, the respective associated uplink control channels.

Aspect 8: The method of any of aspects 1 through 7, wherein performing the conflict resolution procedure comprises: identifying one or more groups of overlapping uplink control channels of the three or more uplink control channels; and selecting a respective uplink control channel from each group of overlapping uplink control channels based on a priority level associated with each uplink control channel of the three or more uplink control channels to generate the resolved set of uplink control channels from the three or more uplink control channels.

Aspect 9: The method of any of aspects 4, 5, or 8, wherein the priority level is based at least in part on a type of transmission associated with each uplink control channel and a scheduled starting time of each uplink control channel.

Aspect 10: The method of any of aspects 4, 5, or 8 through 9, wherein a first uplink control channel having a higher uplink control information type priority has a higher priority level than a second uplink control channel having a lower uplink control information type priority, and a third uplink control channel having a same higher uplink control information type priority as the first uplink control channel has a higher priority level based on the third uplink control channel having an earlier starting slot than the first uplink control channel.

Aspect 11: The method of any of aspects 8 through 10, wherein identifying the one or more groups of overlapping uplink control channels comprises: identifying a temporally first uplink control channel of the three or more uplink control channels and uplink control channels of the three or more uplink control channels that overlap with the temporally first uplink control channel.

Aspect 12: The method of aspect 11, wherein identifying the temporally first uplink control channel comprises: identifying a first uplink control channel within a set of uplink control channels with repetition across multiple transmission time intervals as the temporally first uplink control channel, wherein the first uplink control channel is selected within the set of uplink control channels according to the order.

Aspect 13: The method of any of aspects 11 through 12, wherein performing the conflict resolution procedure comprises: resolving a scheduling overlap involving the temporally first uplink control channel; and identifying a second temporally first uplink control channel within a remaining one or more groups of overlapping uplink control channels and uplink control channels of the three or more uplink control channels that overlap with the second temporally first uplink control channel.

Aspect 14: The method of any of aspects 8 through 13, further comprising: canceling, for each group of overlapping uplink control channels, a remainder of the uplink control channels.

Aspect 15: The method of any of aspects 1 through 14, wherein performing the conflict resolution procedure comprises: generating an ordering of the three or more uplink control channels, where the order includes the ordering; and resolving the two or more scheduling overlaps based on the ordering and a priority level associated with each of the three or more uplink control channels.

Aspect 16: The method of any of aspects 1 through 15, wherein performing the conflict resolution procedure comprises: resolving scheduling overlaps based at least in part on the order until no scheduling overlaps involving an uplink control channel scheduled with repetition across multiple transmission time intervals remain.

Aspect 17: The method of any of aspects 1 through 16, further comprising: determining the order based at least in part on determining a scheduled timing of the three or more uplink control channels and respective durations of the three or more uplink control channels.

Aspect 13: The method of any of aspects 1 through 17, wherein the order comprises, from a first set of uplink control channels with different starting symbols, assignment of a smallest index to an uplink control channel of the first set of uplink control channels with an earliest starting symbol, and the order comprises, between a second set of uplink control channels with a same starting symbol, assignment of the smallest index to an uplink control channel of the second set of uplink control channels with a longest duration.

Aspect 19: A method for wireless communications at a network entity, comprising: transmitting one or more control messages that collectively schedule three or more uplink control channels involving two or more scheduling overlaps between the three or more uplink control channels, at least one of the three or more uplink control channels scheduled with repetition across multiple transmission time intervals; performing a conflict resolution procedure to resolve the two or more scheduling overlaps, the conflict resolution procedure based at least in part on an order for resolving scheduling overlaps between the three or more uplink control channels; and receiving a resolved set of uplink control channels from the three or more uplink control channels based at least in part on the conflict resolution procedure.

Aspect 20: The method of aspect 19, further comprising: determining, from the three or more uplink control channels, a first set of uplink control channels with repetition across multiple transmission time intervals and a second set of uplink control channels, each of the second set of uplink control channels scheduled for transmission within a respective single transmission time interval.

Aspect 21: The method of aspect 20, wherein performing the conflict resolution procedure comprises: resolving, at a first stage, first scheduling overlaps between uplink control channels of the first set of uplink control channels and second scheduling overlaps between uplink control channels of the first set of uplink control channels and the second set of uplink control channels to generate a third set of uplink control channels; resolving, at a second stage, third scheduling overlaps between uplink control channels associated with single transmission time intervals of the third set of uplink control channels to generate the resolved set of uplink control channels.

Aspect 22: The method of aspect 21, wherein resolving the first scheduling overlaps and the second scheduling overlaps comprises: generating an ordering of the first set of uplink control channels and the second set of uplink control channels, wherein the order comprises the ordering; and resolving the first scheduling overlaps and the second scheduling overlaps based at least in part on the ordering and a priority level associated with each uplink control channel of the first set of uplink control channels and the second set of uplink control channels.

Aspect 23: The method of aspect 22, wherein resolving the first scheduling overlaps and the second scheduling overlaps based at least in part on the priority level associated with each uplink control channel of the first set of uplink control channels and the second set of uplink control channels comprises: canceling, for each first scheduling overlap and for each second scheduling overlap, an uplink control channel associated with a lower priority level.

Aspect 24: The method of any of aspects 21 through 23, wherein the third set of uplink control channels includes no scheduling overlaps involving an uplink control channel scheduled with repetition across multiple transmission time intervals.

Aspect 25: The method of any of aspects 21 through 24, wherein resolving the third scheduling overlaps between uplink control channels associated with single transmission time intervals of the third set of uplink control channels comprises: multiplexing, for each third scheduling overlap, the respective associated uplink control channels.

Aspect 26: The method of any of aspects 19 through 25, wherein performing the conflict resolution procedure comprises: identifying one or more groups of overlapping uplink control channels of the three or more uplink control channels; and selecting a respective uplink control channel from each group of overlapping uplink control channels based on a priority level associated with each uplink control channel of the three or more uplink control channels to generate the resolved set of uplink control channels from the three or more uplink control channels.

Aspect 27: The method of any of aspects 22, 23, or 26, wherein the priority level is based at least in part on a type of transmission associated with each uplink control channel and a scheduled starting time of each uplink control channel.

Aspect 28: The method of any of aspects 22, 23, or 26 through 27, wherein a first uplink control channel having a higher uplink control information type priority has a higher priority level than a second uplink control channel having a lower uplink control information type priority, and a third uplink control channel having a same higher uplink control information type priority as the first uplink control channel has a higher priority level based on the third uplink control channel having an earlier starting slot than the first uplink control channel.

Aspect 29: The method of any of aspects 26 through 28, wherein identifying the one or more groups of overlapping uplink control channels comprises: identifying a temporally first uplink control channel of the three or more uplink control channels and uplink control channels of the three or more uplink control channels that overlap with the temporally first uplink control channel.

Aspect 30: The method of aspect 29, wherein identifying the temporally first uplink control channel comprises: identifying a first uplink control channel within a set of uplink control channels with repetition across multiple transmission time intervals as the temporally first uplink control channel, wherein the first uplink control channel is selected within the set of uplink control channels according to the order.

Aspect 31: The method of any of aspects 29 through 30, wherein performing the conflict resolution procedure comprises: resolving a scheduling overlap involving the temporally first uplink control channel; and identifying a second temporally first uplink control channel within a remaining one or more groups of overlapping uplink control channels and uplink control channels of the three or more uplink control channels that overlap with the second temporally first uplink control channel.

Aspect 32: The method of any of aspects 26 through 31, further comprising: canceling, for each group of overlapping uplink control channels, a remainder of the uplink control channels.

Aspect 33: The method of any of aspects 19 through 32, wherein performing the conflict resolution procedure comprises: generating an ordering of the three or more uplink control channels, where the order includes the ordering; and resolving the two or more scheduling overlaps based on the ordering and a priority level associated with each of the three or more uplink control channels.

Aspect 34: The method of any of aspects 19 through 33, wherein performing the conflict resolution procedure comprises: resolving scheduling overlaps based at least in part on the order until no scheduling overlaps involving an uplink control channel scheduled with repetition across multiple transmission time intervals remain.

Aspect 35: The method of any of aspects 19 through 34, wherein determining the order based at least in part on determining a scheduled timing of the three or more uplink control channels and respective durations of the three or more uplink control channels.

Aspect 36: The method of any of aspects 19 through 36, wherein the order comprises, from a first set of uplink control channels with different starting symbols, assignment of a smallest index to an uplink control channel of the first set of uplink control channels with an earliest starting symbol, and the order comprises, between a second set of uplink control channels with a same starting symbol, assignment of the smallest index to an uplink control channel of the second set of uplink control channels with a longest duration.

Aspect 37: An apparatus for wireless communications at a UE, comprising a processor; memory coupled with the processor; and instructions stored in the memory and executable by the processor to cause the apparatus to perform a method of any of aspects 1 through 18.

Aspect 38: An apparatus for wireless communications at a UE, comprising at least one means for performing a method of any of aspects 1 through 18.

Aspect 39: A non-transitory computer-readable medium storing code for wireless communications at a UE, the code comprising instructions executable by a processor to perform a method of any of aspects 1 through 18.

Aspect 40: An apparatus for wireless communications at a network entity, comprising a processor; memory coupled with the processor; and instructions stored in the memory and executable by the processor to cause the apparatus to perform a method of any of aspects 19 through 36.

Aspect 41: An apparatus for wireless communications at a network entity, comprising at least one means for performing a method of any of aspects 19 through 36.

Aspect 42: A non-transitory computer-readable medium storing code for wireless communications at a network entity, the code comprising instructions executable by a processor to perform a method of any of aspects 19 through 36.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, obtaining, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:

receiving, from a network entity, one or more control messages that collectively schedule three or more uplink control channels involving two or more scheduling overlaps between the three or more uplink control channels, at least one of the three or more uplink control channels scheduled with repetition across multiple transmission time intervals;

performing a conflict resolution procedure to resolve the two or more scheduling overlaps, the conflict resolution procedure based at least in part on an order for resolving scheduling overlaps between the three or more uplink control channels, wherein the order is based at least in part on at least one of the three or more uplink control channels being scheduled with repetition across multiple transmission time intervals, wherein, among a first set of uplink control channels with different starting symbols, an uplink control channel of the first set of uplink control channels with an earliest starting symbol is placed earliest in the order, and wherein, among a second set of uplink control channels with a same starting symbol, an uplink control channel of the second set of uplink control channels with a longest duration is placed earliest in the order; and transmitting a resolved set of uplink control channels from the three or more uplink control channels based at least in part on the conflict resolution procedure.

2. The method of claim 1, further comprising:

determining, from the three or more uplink control channels, a third set of uplink control channels with repetition across multiple transmission time intervals and a fourth set of uplink control channels, each of the fourth set of uplink control channels scheduled for transmission within a respective single transmission time interval.

3. The method of claim 2, wherein performing the conflict resolution procedure comprises:

resolving, at a first stage, first scheduling overlaps between uplink control channels of the third set of uplink control channels and second scheduling overlaps between uplink control channels of the third set of uplink control channels and the fourth set of uplink control channels to generate a fifth set of uplink control channels; and resolving, at a second stage, third scheduling overlaps between uplink control channels associated with single transmission time intervals of the fifth set of uplink control channels to generate the resolved set of uplink control channels.

4. The method of claim 3, wherein resolving the first scheduling overlaps and the second scheduling overlaps comprises:

generating an ordering of the third set of uplink control channels and the fourth set of uplink control channels, wherein the order comprises the ordering; and resolving the first scheduling overlaps and the second scheduling overlaps based at least in part on the ordering and a priority level associated with each uplink control channel of the third set of uplink control channels and the fourth set of uplink control channels.

5. The method of claim 4, wherein resolving the first scheduling overlaps and the second scheduling overlaps based at least in part on the priority level associated with each uplink control channel of the third set of uplink control channels and the fourth set of uplink control channels comprises:

canceling, for each first scheduling overlap and for each second scheduling overlap, an uplink control channel associated with a lower priority level.

6. The method of claim 3, wherein the fifth set of uplink control channels includes no scheduling overlaps involving an uplink control channel scheduled with repetition across multiple transmission time intervals.

7. The method of claim 3, wherein resolving the third scheduling overlaps between uplink control channels associated with single transmission time intervals of the fifth set of uplink control channels comprises:

multiplexing, for each third scheduling overlap, the respective associated uplink control channels.

8. The method of claim 1, wherein performing the conflict resolution procedure comprises:

identifying one or more groups of overlapping uplink control channels of the three or more uplink control channels; and selecting a respective uplink control channel from each group of overlapping uplink control channels based on a priority level associated with each uplink control channel of the three or more uplink control channels to generate the resolved set of uplink control channels from the three or more uplink control channels.

9. The method of claim 8, wherein the priority level is based at least in part on a type of transmission associated with each uplink control channel and a scheduled starting time of each uplink control channel.

10. The method of claim 8, wherein a first uplink control channel having a higher uplink control information type priority has a higher priority level than a second uplink control channel having a lower uplink control information type priority, and wherein a third uplink control channel having a same higher uplink control information type priority as the first uplink control channel has a higher priority level based on the third uplink control channel having an earlier starting slot than the first uplink control channel.

11. The method of claim 8, wherein identifying the one or more groups of overlapping uplink control channels comprises:

identifying a temporally first uplink control channel of the three or more uplink control channels and uplink control channels of the three or more uplink control channels that overlap with the temporally first uplink control channel.

12. The method of claim 11, wherein identifying the temporally first uplink control channel comprises:

identifying a first uplink control channel within a set of uplink control channels with repetition across multiple transmission time intervals as the temporally first uplink control channel, wherein the first uplink control channel is selected within the set of uplink control channels according to the order.

13. The method of claim 11, wherein performing the conflict resolution procedure comprises:

resolving a scheduling overlap involving the temporally first uplink control channel; and identifying a second temporally first uplink control channel within a remaining one or more groups of overlapping uplink control channels and uplink control channels of the three or more uplink control channels that overlap with the second temporally first uplink control channel.

14. The method of claim 8, further comprising:

canceling, for each group of overlapping uplink control channels, a remainder of the uplink control channels.

15. The method of claim 1, wherein performing the conflict resolution procedure comprises:

generating an ordering of the three or more uplink control channels, wherein the order includes the ordering; and resolving the two or more scheduling overlaps based on the ordering and a priority level associated with each of the three or more uplink control channels.

16. The method of claim 1, wherein performing the conflict resolution procedure comprises:

resolving scheduling overlaps based at least in part on the order until no scheduling overlaps involving an uplink control channel scheduled with repetition across multiple transmission time intervals remain.

17. The method of claim 1, further comprising:

determining the order based at least in part on determining a scheduled timing of the three or more uplink control channels and respective durations of the three or more uplink control channels.

18. A method for wireless communications at a network entity, comprising:

transmitting one or more control messages that collectively schedule three or more uplink control channels involving two or more scheduling overlaps between the three or more uplink control channels, at least one of the three or more uplink control channels scheduled with repetition across multiple transmission time intervals;

performing a conflict resolution procedure to resolve the two or more scheduling overlaps, the conflict resolution procedure based at least in part on an order for resolving scheduling overlaps between the three or more uplink control channels, wherein the order is based at least in part on at least one of the three or more uplink control channels being scheduled with repetition across multiple transmission time intervals, wherein, among a first set of uplink control channels with different starting symbols, an uplink control channel of the first set of uplink control channels with an earliest starting symbol is placed earliest in the order, and wherein, among a second set of uplink control channels with a same starting symbol, an uplink control channel of the second set of uplink control channels with a longest duration is placed earliest in the order; and receiving a resolved set of uplink control channels from the three or more uplink control channels based at least in part on the conflict resolution procedure.

19. The method of claim 18, further comprising:

determining, from the three or more uplink control channels, a third set of uplink control channels with repetition across multiple transmission time intervals and a fourth set of uplink control channels, each of the fourth set of uplink control channels scheduled for transmission within a respective single transmission time interval.

20. The method of claim 19, wherein performing the conflict resolution procedure comprises:

resolving, at a first stage, first scheduling overlaps between uplink control channels of the third set of uplink control channels and second scheduling overlaps between uplink control channels of the third set of uplink control channels and the fourth set of uplink control channels to generate a fifth set of uplink control channels; and resolving, at a second stage, third scheduling overlaps between uplink control channels associated with single transmission time intervals of the fifth set of uplink control channels to generate the resolved set of uplink control channels.

21. The method of claim 20, wherein resolving the first scheduling overlaps and the second scheduling overlaps comprises:

generating an ordering of the third set of uplink control channels and the fourth set of uplink control channels, wherein the order comprises the ordering; and resolving the first scheduling overlaps and the second scheduling overlaps based at least in part on the ordering and a priority level associated with each uplink control channel of the third set of uplink control channels and the fourth set of uplink control channels.

22. The method of claim 21, wherein resolving the first scheduling overlaps and the second scheduling overlaps based at least in part on the priority level associated with each uplink control channel of the third set of uplink control channels and the fourth set of uplink control channels comprises:

canceling, for each first scheduling overlap and for each second scheduling overlap, an uplink control channel associated with a lower priority level.

23. The method of claim 20, wherein the fifth set of uplink control channels includes no scheduling overlaps involving an uplink control channel scheduled with repetition across multiple transmission time intervals.

24. The method of claim 20, wherein resolving the third scheduling overlaps between uplink control channels associated with single transmission time intervals of the fifth set of uplink control channels comprises:

multiplexing, for each third scheduling overlap, the respective associated uplink control channels.

25. The method of claim 18, wherein performing the conflict resolution procedure comprises:

identifying one or more groups of overlapping uplink control channels of the three or more uplink control channels; and selecting a respective uplink control channel from each group of overlapping uplink control channels based on a priority level associated with each uplink control channel of the three or more uplink control channels to generate the resolved set of uplink control channels from the three or more uplink control channels.

26. The method of claim 25, wherein the priority level is based at least in part on a type of transmission associated with each uplink control channel and a scheduled starting time of each uplink control channel.

27. The method of claim 25, wherein a first uplink control channel having a higher uplink control information type priority has a higher priority level than a second uplink control channel having a lower uplink control information type priority, and wherein a third uplink control channel having a same higher uplink control information type priority as the first uplink control channel has a higher priority level based on the third uplink control channel having an earlier starting slot than the first uplink control channel.

28. A user equipment (UE) comprising:

one or more processors;

one or more memories coupled with the one or more processors; and instructions stored in the one or more memories and executable by the one or more processors to cause the UE to:

receive, from a network entity, one or more control messages that collectively schedule three or more uplink control channels involving two or more scheduling overlaps between the three or more uplink control channels, at least one of the three or more uplink control channels scheduled with repetition across multiple transmission time intervals;

perform a conflict resolution procedure to resolve the two or more scheduling overlaps, the conflict resolution procedure based at least in part on an order for resolving scheduling overlaps between the three or more uplink control channels, wherein the order is based at least in part on at least one of the three or more uplink control channels being scheduled with repetition across multiple transmission time intervals, wherein, among a first set of uplink control channels with different starting symbols, an uplink control channel of the first set of uplink control channels with an earliest starting symbol is placed earliest in the order, and wherein, among a second set of uplink control channels with a same starting symbol, an uplink control channel of the second set of uplink control channels with a longest duration is placed earliest in the order; and transmit a resolved set of uplink control channels from the three or more uplink control channels based at least in part on the conflict resolution procedure.

29. A network entity comprising:

one or more processors;

one or more memories coupled with the one or more processors; and instructions stored in the one or more memories and executable by the one or more processors to cause the network entity to:

transmit one or more control messages that collectively schedule three or more uplink control channels involving two or more scheduling overlaps between the three or more uplink control channels, at least one of the three or more uplink control channels scheduled with repetition across multiple transmission time intervals;

perform a conflict resolution procedure to resolve the two or more scheduling overlaps, the conflict resolution procedure based at least in part on an order for resolving scheduling overlaps between the three or more uplink control channels, wherein the order is based at least in part on at least one of the three or more uplink control channels being scheduled with repetition across multiple transmission time intervals, wherein, among a first set of uplink control channels with different starting symbols, an uplink control channel of the first set of uplink control channels with an earliest starting symbol is placed earliest in the order, and wherein, among a second set of uplink control channels with a same starting symbol, an uplink control channel of the second set of uplink control channels with a longest duration is placed earliest in the order; and receive a resolved set of uplink control channels from the three or more uplink control channels based at least in part on the conflict resolution procedure.

30. The method of claim 18, wherein performing the conflict resolution procedure comprises:

resolving scheduling overlaps based at least in part on the order until no scheduling overlaps involving an uplink control channel scheduled with repetition across multiple transmission time intervals remain.

* * * * *